US012812085B2

(12) United States Patent
Jang et al.

(10) Patent No.: US 12,812,085 B2
(45) Date of Patent: Nov. 24, 2026

(54) FEATURE ENCODING/DECODING METHOD AND DEVICE BASED ON INTER-CHANNEL REFERENCE OF ENCODING STRUCTURE, RECORDING MEDIUM IN WHICH BITSTREAM IS STORED, AND BITSTREAM TRANSMISSION METHOD

(71) Applicant: LG Electronics Inc., Seoul (KR)

(72) Inventors: Hyeong Moon Jang, Seoul (KR); Chulkeun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 135 days.

(21) Appl. No.: 18/700,423

(22) PCT Filed: Nov. 1, 2022

(86) PCT No.: PCT/KR2022/016926

§ 371 (c)(1),
(2) Date: Apr. 11, 2024

(87) PCT Pub. No.: WO2023/075568

PCT Pub. Date: May 4, 2023

(65) Prior Publication Data

US 2024/0406372 A1 Dec. 5, 2024

(30) Foreign Application Priority Data

Nov. 1, 2021 (KR) ........................ 10-2021-0148076
Nov. 1, 2021 (KR) ........................ 10-2021-0148118

(51) Int. Cl.
*H04N 7/12* (2006.01)
*H04N 19/103* (2014.01)
(Continued)

(52) U.S. Cl.
CPC ......... *H04N 19/103* (2014.11); *H04N 19/124* (2014.11); *H04N 19/132* (2014.11);
(Continued)

(58) Field of Classification Search
CPC .................................................... H04N 19/103
See application file for complete search history.

(56) References Cited

FOREIGN PATENT DOCUMENTS

KR 10-2018-0121908 11/2018
KR 10-1941298 1/2019
(Continued)

OTHER PUBLICATIONS

Gao et al., "Recent Standard Development Activities on Video Coding for Machines," CoRR, Submitted on May 26, 2021, arXiv:2105.12653v1, 15 pages.
(Continued)

*Primary Examiner* — Young Lee
(74) *Attorney, Agent, or Firm* — Fish & Richardson P.C.

(57) ABSTRACT

Provided are a feature encoding/decoding method and device, a recording medium in which a bitstream generated by the feature encoding method is stored, and a method for transmitting the bitstream. A feature decoding method according to the present disclosure comprises the steps of: determining an encoding structure of a current channel in a feature map; acquiring, on the basis of the encoding structure, a current block by splitting the current channel; and reconstructing the current block, wherein the encoding structure of the current channel can be determined on the basis of whether an inter-channel reference referring to an encoding structure of a channel, having been reconstructed for the current channel, is applied.

14 Claims, 26 Drawing Sheets

(51) Int. Cl.

| | |
|---|---|
| ***H04N 19/124*** | (2014.01) |
| ***H04N 19/132*** | (2014.01) |
| ***H04N 19/136*** | (2014.01) |
| ***H04N 19/176*** | (2014.01) |
| ***H04N 19/184*** | (2014.01) |

(52) U.S. Cl.
CPC ......... *H04N 19/136* (2014.11); *H04N 19/176* (2014.11); *H04N 19/184* (2014.11)

(56) References Cited

FOREIGN PATENT DOCUMENTS

| | | |
|---|---|---|
| KR | 10-2063285 | 1/2020 |
| WO | WO 2021/201642 | 10/2021 |

OTHER PUBLICATIONS

International Search Report and Written Opinion in International Appln. No. PCT/KR2022/016926, mailed on Feb. 8, 2023, 9 pages (with partial English translation).

NUMBER OF CHANNELS 64
RANG OF VALUE (−∞, ∞)
DATA TYPE 32-BIT FLOATING POINT

<64-channel feature set>

Feature Tensor

FIG. 14

| *coding_feature_unit*( ) { | **Descriptor** |
|---|---|
| … | |
| for (ch =0; ch < N-1; ch++) | ae(v) |
| *coding_channel_unit*(… , ch, …) | |
| … | |
| } | |

FIG. 15

| *channel_coding_unit*(…, ch, … ) { | **Descriptor** |
|---|---|
| **pred_st_idx** | |
| **root_inherit_st_flag** | ae(v) |
| if( !root_inherit_st_flag) { | ae(v) |
| **child_inherit_st_flag** | |
| } | |
| *channel_coding_tree*( x, y, root_inherit_st_flag, child_inherit_st_flag...) | |
| | |
| … | |
| } | |

FIG. 16

| *channel_coding_tree*( x, y, root_inherit_st_flag, parent_inherit_st_flag, … ) { | **Descriptor** |
|---|---|
| … | |
| if(parent_inherit_st_flag) { | |
| for ( idx = 0 ; idx < numChild; idx++) { | |
| if (root_inherit_st_flag) { | |
| **child_inherit_st_flag** | ae(v) |
| } | |
| *channel_coding_tree*( x0, y0, root_inherit_st_flag, child_inherit_st_flag) | |
| } | |
| } | |
| else { | |
| **child_st_information** | ae(v) |
| for ( idx = 0 ; idx < numChild; idx++) { | |
| *channel_coding_tree*( x0, y0, root_inherit_st_flag, 0) | |
| } | |
| } | |
| | |
| … | |
| } | |

| |
|---|
| Feature Data parameter set( ) { |
| ... |
| Feature data width |
| Feature data height |
| Feature data ch |
| Out feature data width |
| Out feature data height |
| Out feature data ch |
| ... |

| |
|---|
| UpSampling parameter set( ) { |
| ... |
| Num Filter Tap |
| for (i=0; i<Num Filter Tap; i++) { |
| FilterCoeff[ i ] |
| } |
| ... |

FEATURE ENCODING/DECODING METHOD AND DEVICE BASED ON INTER-CHANNEL REFERENCE OF ENCODING STRUCTURE, RECORDING MEDIUM IN WHICH BITSTREAM IS STORED, AND BITSTREAM TRANSMISSION METHOD

CROSS-REFERENCE TO RELATED APPLICATIONS

This application is a National Stage application under 35 U.S.C. § 371 of International Application No. PCT/KR2022/016926, filed on Nov. 1, 2022, which claims the benefit of Korean Patent Application No. 10-2021-0148076, filed on Nov. 1, 2021, and Korean Patent Application No. 10-2021-0148118, filed on Nov. 1, 2021. The disclosures of the prior applications are incorporated by reference in their entirety.

TECHNICAL FIELD

The present disclosure relates to a feature encoding/decoding method and apparatus, and more specifically, to a feature encoding/decoding method and apparatus based on inter-channel reference of a coding structure, a recording medium storing a bitstream generated by the feature encoding method/apparatus of the present disclosure and a method of transmitting the bitstream.

BACKGROUND

With the development of machine learning technology, demand for image processing-based artificial intelligence services is increasing. In order to effectively process a vast amount of image data required for artificial intelligence services within limited resources, image compression technology optimized for machine task performance is essential. However, existing image compression technology has been developed with the goal of high-resolution, high-quality image processing for human vision, and has the problem of being unsuitable for artificial intelligence services. Accordingly, research and development on new machine-oriented image compression technology suitable for artificial intelligence services is actively underway.

SUMMARY

An object of the present disclosure is to provide a feature encoding/decoding method and apparatus with improved encoding/decoding efficiency.

Another object of the present disclosure is to provide a feature encoding/decoding method and apparatus based on inter-channel reference of a coding structure.

Another object of the present disclosure is to provide a feature encoding/decoding method and apparatus based on sub-sampling and up-sampling of feature data.

Another object of the present disclosure is to provide a method of transmitting a bitstream generated by a feature encoding method or apparatus.

Another object of the present disclosure is to provide a recording medium storing a bitstream generated by a feature encoding method or apparatus according to the present disclosure.

Another object of the present disclosure is to provide a recording medium storing a bitstream received, decoded and used to reconstruct a feature by a feature decoding apparatus according to the present disclosure.

The technical problems solved by the present disclosure are not limited to the above technical problems and other technical problems which are not described herein will become apparent to those skilled in the art from the following description.

A feature decoding method according to an aspect of the present disclosure may comprise determining a coding structure of a current channel in a feature map, obtaining a current block by splitting the current channel based on the coding structure, and reconstructing the current block. The coding structure of the current channel may be determined based on whether inter-channel reference referencing a coding structure of a previously reconstructed channel is applied to the current channel.

A feature decoding apparatus according to another aspect of the present disclosure may comprise a memory and at least one processor. The at least one processor may determine a coding structure of a current channel in a feature map, obtain a current block by splitting the current channel based on the coding structure, and reconstruct the current block. The coding structure of the current channel may be determined based on whether inter-channel reference referencing a coding structure of a previously reconstructed channel is applied to the current channel.

A feature encoding method according to another embodiment of the present disclosure may determining a coding structure of a current channel in a feature map, obtaining a current block by splitting the current channel based on the coding structure, and encoding the current block. The coding structure of the current channel may be determined based on whether inter-channel reference referencing a coding structure of a previously encoded channel is applied to the current channel.

A feature encoding apparatus according to another aspect of the present disclosure may comprise a memory and at least one processor. The at least one processor may determine a coding structure of a current channel in a feature map, obtain a current block by splitting the current channel based on the coding structure, and encode the current block. The coding structure of the current channel may be determined based on whether inter-channel reference referencing a coding structure of a previously encoded channel is applied to the current channel.

In addition, a recording medium according to another aspect of the present disclosure may store a bitstream generated by the feature encoding method or the feature encoding apparatus of the present disclosure.

In addition, a bitstream transmission method according to another aspect of the present disclosure may transmit a bitstream generated by the feature encoding method or the feature encoding apparatus of the present disclosure to a feature decoding apparatus.

The features briefly summarized above with respect to the present disclosure are merely exemplary aspects of the detailed description below of the present disclosure, and do not limit the scope of the present disclosure.

According to the present disclosure, it is possible to provide a feature encoding/decoding method and apparatus with improved encoding/decoding efficiency.

According to the present disclosure, it is possible to provide a feature encoding/decoding method and apparatus based on inter-channel reference of a coding structure.

According to the present disclosure, it is possible to provide a feature encoding/decoding method and apparatus based on sub-sampling and up-sampling of feature data.

According to the present disclosure, it is possible to provide a method of transmitting a bitstream generated by a feature encoding method or apparatus.

According to the present disclosure, it is possible to provide a recording medium storing a bitstream generated by a feature encoding method or apparatus according to the present disclosure.

According to the present disclosure, it is possible to provide a recording medium storing a bitstream received, decoded and used to reconstruct a feature by a feature decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIG. 14 is a diagram showing coding_feature_unit syntax according to an embodiment of the present disclosure.

FIG. 15 is a diagram showing channel_coding_unit syntax according to an embodiment of the present disclosure.

FIG. 16 is a diagram illustrating channel_coding_tree syntax according to an embodiment of the present disclosure.

DETAILED DESCRIPTION

Figure 1:
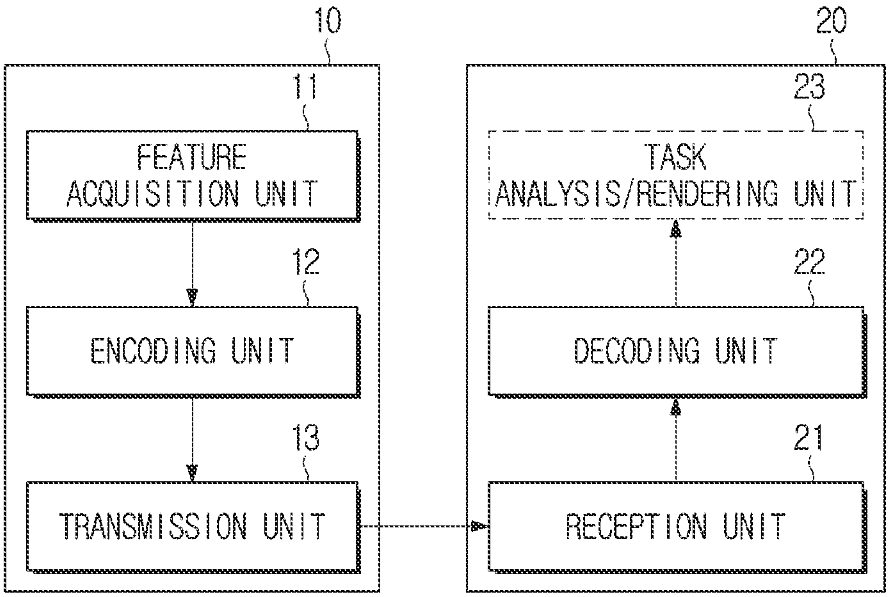
FIG. 1 is a view schematically showing a VCM system to which embodiments of the present disclosure are applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, in case it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

The present disclosure may be applied to a method disclosed in a Versatile Video Coding (VVC) standard and/or a Video Coding for Machines (VCM) standard. In addition, the present disclosure may be applied to a method disclosed in an essential video coding (EVC) standard, AOMedia Video 1 (AV1) standard, 2nd generation of audio video coding standard (AVS2), or a next-generation video/image coding standard (e.g., H.267 or H.268, etc.).

This disclosure provides various embodiments related to video/image coding, and, unless otherwise stated, the embodiments may be performed in combination with each other. In the present disclosure, "video" refers to a set of a series of images according to the passage of time. An "image" may be information generated by artificial intelligence (AI) Input information used in the process of performing a series of tasks by AI, information generated during the information processing process, and the output information may be used as images. In the present disclosure, a "picture" generally refers to a unit representing one image in a specific time period, and a slice/tile is a coding unit constituting a part of a picture in encoding. One picture may be composed of one or more slices/tiles. In addition, a slice/tile may include one or more coding tree units (CTUs). The CTU may be partitioned into one or more CUs. A tile is a rectangular region present in a specific tile row and a specific tile column in a picture, and may be composed of a plurality of CTUs. A tile column may be defined as a rectangular region of CTUs, may have the same height as a picture, and may have a width specified by a syntax element signaled from a bitstream part such as a picture parameter set. A tile row may be defined as a rectangular region of CTUs, may have the same width as a picture, and may have a height specified by a syntax element signaled from a bitstream part such as a picture parameter set. A tile scan is a certain continuous ordering method of CTUs partitioning a picture. Here, CTUs may be sequentially ordered according to a CTU raster scan within a tile, and tiles in a picture may be sequentially ordered according to a raster scan order of tiles of the picture. A slice may contain an integer number of complete tiles, or may contain a continuous integer number of complete CTU rows within one tile of one picture. A slice may be exclusively included in a single NAL unit. One picture may be composed of one or more tile groups. One tile group may include one or more tiles. A brick may indicate a rectangular region of CTU rows within a tile in a picture. One tile may include one or more bricks. The brick may refer to a rectangular region of CTU rows in a tile. One tile may be split into a plurality of bricks, and each brick may include one or more CTU rows belonging to a tile. A tile which is not split into a plurality of bricks may also be treated as a brick.

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In an embodiment, especially when applied to VCM, when there is a picture composed of a set of components having different characteristics and meanings, a pixel/pixel value may represent a pixel/pixel value of a component generated through independent information or combination, synthesis, and analysis of each component. For example, in RGB input, only the pixel/pixel value of R may be represented, only the pixel/pixel value of G may be represented, or only the pixel/pixel value of B may be represented. For example, only the pixel/pixel value of a luma component synthesized using the R. G. and B components may be represented. For example, only the pixel/pixel values of images and information extracted through analysis of R, G, and B components from components may be represented.

In the present disclosure, a "unit" may represent a basic unit of image processing. The unit may include at least one of a specific region of the picture and information related to the region. One unit may include one luma block and two chroma (e.g., Cb and Cr) blocks. The unit may be used interchangeably with terms such as "sample array", "block" or "area" in some cases. In a general case, an M×N block may include samples (or sample arrays) or a set (or array) of transform coefficients of M columns and N rows. In an embodiment. In particular, especially when applied to VCM, the unit may represent a basic unit containing information for performing a specific task.

In the present disclosure, "current block" may mean one of "current coding block". "current coding unit", "coding target block", "decoding target block" or "processing target block". When prediction is performed, "current block" may mean "current prediction block" or "prediction target block". When transform (inverse transform)/quantization (dequantization) is performed. "current block" may mean "current transform block" or "transform target block". When filtering is performed. "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "." should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A". 2) only "B", and/or 3) both "A and B". In other words, in the present disclosure, the term "or" should be interpreted to indicate "additionally or alternatively."

The present disclosure relates to video/image coding for machines (VCM).

VCM refers to a compression technology that encodes/decodes part of a source image/video or information obtained from the source image/video for the purpose of machine vision. In VCM, the encoding/decoding target may be referred to as a feature. The feature may refer to information extracted from the source image/video based on task purpose, requirements, surrounding environment, etc. The feature may have a different information form from the source image/video, and accordingly, the compression method and expression format of the feature may also be different from those of the video source.

VCM may be applied to a variety of application fields. For example, in a surveillance system that recognizes and tracks objects or people, VCM may be used to store or transmit object recognition information. In addition, in intelligent transportation or smart traffic systems, VCM may be used to transmit vehicle location information collected from GPS, sensing information collected from LIDAR, radar, etc., and various vehicle control information to other vehicles or infrastructure. Additionally, in the smart city field. VCM may be used to perform individual tasks of interconnected sensor nodes or devices.

The present disclosure provides various embodiments of feature/feature map coding. Unless otherwise specified, embodiments of the present disclosure may be implemented individually, or may be implemented in combination of two or more.

Overview of VCM System

FIG. 1 is a diagram schematically showing a VCM system to which embodiments of the present disclosure are applicable.

Referring to FIG. 1, the VCM system may include an encoding apparatus 10 and a decoding apparatus 20.

The encoding apparatus 10 may compress/encode a feature/feature map extracted from a source image/video to generate a bitstream, and transmit the generated bitstream to the decoding apparatus 20 through a storage medium or network. The encoding apparatus 10 may also be referred to as a feature encoding apparatus. In a VCM system, the feature/feature map may be generated at each hidden layer of a neural network. The size and number of channels of the generated feature map may vary depending on the type of neural network or the location of the hidden laver. In the present disclosure, a feature map may be referred to as a feature set.

The encoding apparatus 10 may include a feature acquisition unit 11, an encoding unit 12, and a transmission unit 13.

The feature acquisition unit 11 may acquire a feature/feature map for the source image/video. Depending on the embodiment, the feature acquisition unit 11 may acquire a feature/feature map from an external device, for example, a feature extraction network. In this case, the feature acquisition unit 11 performs a feature reception interface function. Alternatively, the feature acquisition unit 11 may acquire a feature/feature map by executing a neural network (e.g., CNN, DNN, etc.) using the source image/video as input. In this case, the feature acquisition unit 11 performs a feature extraction network function.

Depending on the embodiment, the encoding apparatus 10 may further include a source image generator (not shown) for acquiring the source image/video. The source image generator may be implemented with an image sensor, a camera module, etc., and may acquire the source image/video through an image/video capture, synthesis, or generation process. In this case, the generated source image/video may be sent to the feature extraction network and used as input data for extracting the feature/feature map.

The encoding unit 12 may encode the feature/feature map acquired by the feature acquisition unit 11. The encoding unit 12 may perform a series of procedures such as prediction, transform, and quantization to increase encoding efficiency. The encoded data (encoded feature/feature map information) may be output in the form of a bitstream. The bitstream containing the encoded feature/feature map information may be referred to as a VCM bitstream.

The transmission unit 13 may send feature/feature map information or data output in the form of a bitstream to the decoding apparatus 20 through a digital storage medium or network in the form of a file or streaming. Here, digital storage media may include various storage media such as USB. SD, CD, DVD, Blu-ray, HDD, and SSD. The transmission unit 13 may include elements for generating a media file with a predetermined file format or elements for transmitting data through a broadcasting/communication network.

The decoding apparatus 20 may acquire feature/feature map information from the encoding apparatus 10 and reconstruct the feature/feature map based on the acquired information.

The decoding apparatus 20 may include a reception unit 21 and a decoding unit 22.

The reception unit 21 may receive a bitstream from the encoding apparatus 10, acquire feature/feature map information from the received bitstream, and send it to the decoding unit 22.

The decoding unit 22 may decode the feature/feature map based on the acquired feature/feature map information. The decoding unit 22 may perform a series of procedures such as dequantization, inverse transform, and prediction corresponding to the operation of the encoding unit 12 to increase decoding efficiency.

Depending on the embodiment, the decoding apparatus 20 may further include a task analysis/rendering unit 23.

The task analysis/rendering unit 23 may perform task analysis based on the decoded feature/feature map. Additionally, the task analysis/rendering unit 23 may render the decoded feature/feature map into a form suitable for task performance. Various machine (oriented) tasks may be performed based on task analysis results and the rendered features/feature map.

As described above, the VCM system may encode/decode the feature extracted from the source image/video according to user and/or machine requests, task purpose, and surrounding environment, and performs various machine (oriented) tasks based on the decoded feature. The VCM system may be implemented by expanding/redesigning the video/image coding system and may perform various encoding/decoding methods defined in the VCM standard.

VCM Pipeline

Figure 2:
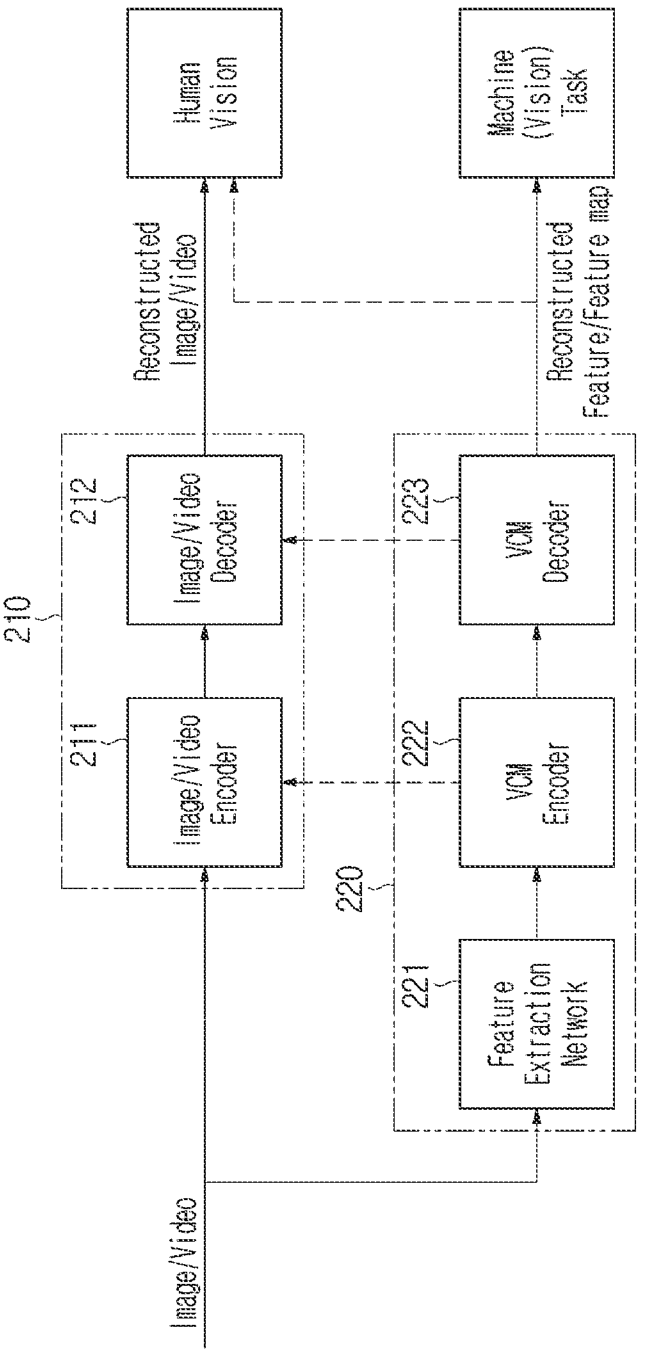
FIG. 2 is a diagram schematically showing a VCM pipeline structure to which embodiments of the present disclosure are applicable.

FIG. 2 is a diagram schematically showing a VCM pipeline structure to which embodiments of the present disclosure are applicable.

Referring to FIG. 2, the VCM pipeline 200 may include a first pipeline 210 for encoding/decoding an image/video and a second pipeline 220 for encoding/decoding a feature/feature map. In the present disclosure, the first pipeline 210 may be referred to as a video codec pipeline, and the second pipeline 220 may be referred to as a feature codec pipeline.

The first pipeline 210 may include a first stage 211 for encoding an input image/video and a second stage 212 for decoding the encoded image/video to generate a reconstructed image/video. The reconstructed image/video may be used for human viewing, that is, human vision.

The second pipeline 220 may include a third stage 221 for extracting a feature/feature map from the input image/video, a fourth stage 222 for encoding the extracted feature/feature map, and a fifth stage 223 for decoding the encoded feature/feature map to generate a reconstructed feature/feature map. The reconstructed feature/feature map may be used for a machine (vision) task. Here, the machine (vision) task may refer to a task in which images/videos are consumed by a machine. The machine (vision) task may be applied to service scenarios such as, for example, Surveillance, Intelligent Transportation. Smart City, Intelligent Industry. Intelligent Content, etc. Depending on the embodiment, the reconstructed feature/feature map may be used for human vision.

Depending on the embodiment, the feature/feature map encoded in the fourth stage 222 may be transferred to the first stage 221 and used to encode the image/video. In this case, an additional bitstream may be generated based on the encoded feature/feature map, and the generated additional bitstream may be transferred to the second stage 222 and used to decode the image/video.

Depending on the embodiment, the feature/feature map decoded in the fifth stage 223 may be transferred to the second stage 222 and used to decode the image/video.

FIG. 2 shows a case where the VCM pipeline 200 includes a first pipeline 210 and a second pipeline 220, but this is merely an example and embodiments of the present disclosure are not limited thereto. For example, the VCM pipeline 200 may include only the second pipeline 220, or the second pipeline 220 may be expanded into multiple feature codec pipelines.

Meanwhile, in the first pipeline 210, the first stage 211 may be performed by an image/video encoder, and the second stage 212 may be performed by an image/video decoder. Additionally, in the second pipeline 220, the third stage 221 may be performed by a VCM encoder (or feature/feature map encoder), and the fourth stage 222 may be performed by a VCM decoder (or feature/feature map encoder). Hereinafter, the encoder/decoder structure will be described in detail.

Encoder

Figure 3:
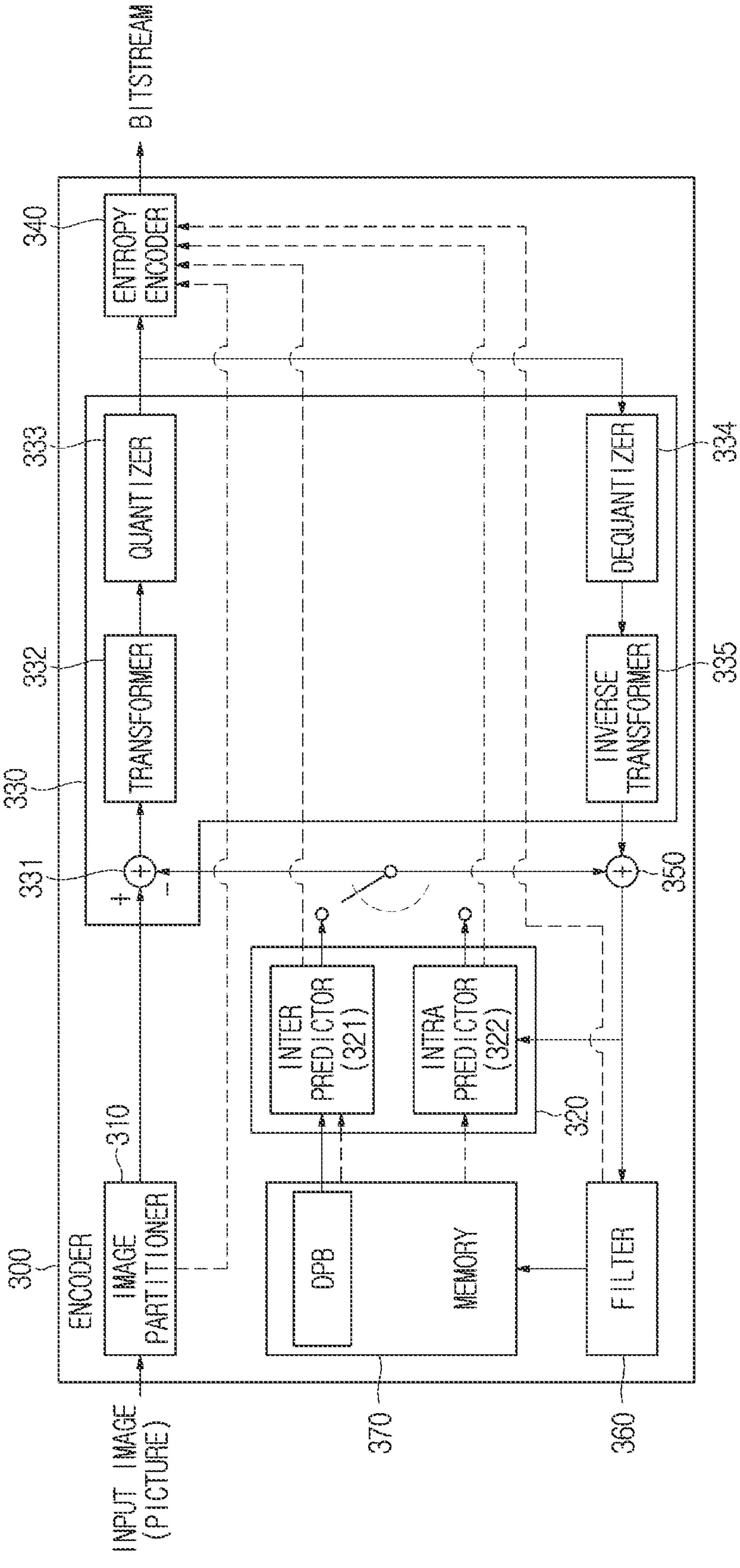
FIG. 3 is a diagram schematically showing an image/video encoder to which embodiments of the present disclosure are applicable.

FIG. 3 is a diagram schematically showing an image/video encoder to which embodiments of the present disclosure are applicable.

Referring to FIG. 3, the image/video encoder 300 may further include an image partitioner 310, a predictor 320, a residual processor 330, an entropy encoder 340, and an adder 350, a filter 360, and a memory 370. The predictor 320 may include an inter predictor 321 and an intra predictor 322. The residual processor 330 may include a transformer 332, a quantizer 333, a dequantizer 334, and an inverse transformer 335. The residual processor 330 may further include a subtractor 331. The adder 350 may be referred to as a reconstructor or a reconstructed block generator. The image partitioner 310, the predictor 320, the residual processor 330, the entropy encoder 340, the adder 350, and the filter 360 may be configured by one or more hardware components (e.g., encoder chipset or processor) depending on the embodiment. Additionally, the memory 370 may include a decoded picture buffer (DPB) and may be configured by a digital storage medium. The hardware components described above may further include a memory 370 as an internal/external component.

The image partitioner 310 may partition an input image (or picture, frame) input to the image/video encoder 300 into one or more processing units. As an example, the processing unit may be referred to as a coding unit (CU). The coding unit may be recursively partitioned according to a quad-tree binary-tree ternary-tree (QTBTTT) structure from a coding tree unit (CTU) or largest coding unit (LCU) For example, one coding unit may be partitioned into a plurality of coding units of deeper depth based on a quad tree structure, binary tree structure, and/or temary structure. In this case, for example, the quad tree structure may be applied first and the binary tree structure and/or ternary structure may be applied later. Alternatively, the binary tree structure may be applied first. The image/video coding procedure according to the present disclosure may be performed based on a final coding unit that is no longer partitioned. In this case, the largest coding unit may be used as the final coding unit based on coding efficiency according to image characteristics, or, if necessary, the coding unit may be recursively partitioned into coding units of deeper depth to use a coding unit with an optimal size as the final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may each be divided or partitioned from the final coding unit described above. The prediction unit may be a unit of sample prediction, and the transform unit may be a unit for deriving a transform coefficient and/or a unit for deriving a residual signal from the transform coefficient.

In some cases, the unit may be used interchangeably with terms such as block or area. In a general case, an M×N block may represent a set of samples or transform coefficients consisting of M columns and N rows. A sample may generally represent a pixel or a pixel value, and may represent only a pixel/pixel value of a luma component, or only a pixel/pixel value of a chroma component. The sample may be used as a term corresponding to pixel or pel.

The image/video encoder 300 may generate a residual signal (residual block, residual sample array) by subtracting a prediction signal (predicted block, prediction sample array) output from the inter predictor 321 or the intra predictor 322 from the input image signal (original block, original sample array) and transmit the generated residual signal to the transformer 332. In this case, as shown, the unit that subtracts the prediction signal (prediction block, prediction sample array) from the input image signal (original block, original sample array) within the image/video encoder 300 may be referred to as the subtractor 331. The predictor may perform prediction on a processing target block (hereinafter referred to as a current block) and generate a predicted block including prediction samples for the current block. The predictor may determine whether intra prediction or inter prediction is applied in current block or CU units. The predictor may generate various information related to prediction, such as prediction mode information, and transfer it to the entropy encoder 340. Information about prediction may be encoded in the entropy encoder 340 and output in the form of a bitstream.

The intra predictor 322 may predict the current block by referring to the samples in the current picture. At this time, the referenced samples may be located in the neighbor of the current block or may be located away from the current block, depending on the prediction mode. In intra prediction, the prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on settings. The intra predictor 322 may determine the prediction mode applied to the current block by using a prediction mode applied to a neighboring block.

The inter predictor 321 may derive a predicted block for the current block based on a reference block (reference sample array) specified by a motion vector on a reference picture. In this case, in order to reduce the amount of motion information transmitted in the inter prediction mode, the motion information may be predicted in block, subblock, or sample units based on correlation of motion information between the neighboring block and the current block. The motion information may include a motion vector and a reference picture index. The motion information may further include inter prediction direction (L0 prediction. L1 prediction. Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 321 may construct a motion information candidate list based on neighboring blocks and generate information indicating which candidate is used to derive a motion vector and/or reference picture index of the current block. Inter prediction may be performed based on various prediction modes, and, for example, in the case of a skip mode and a merge mode, the inter predictor 321 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and a motion vector difference may be signaled to indicate the motion vector of the current block.

The predictor 320 may generate a prediction signal based on various prediction methods. For example, the predictor may not only apply intra prediction or inter prediction but also simultaneously apply both intra prediction and inter prediction, for prediction of one block. This may be called combined inter and intra prediction (CIIP). In addition, the predictor may be based on an intra block copy (IBC) prediction mode or a palette mode for prediction of the block. The IBC prediction mode or the palette mode may be used for content image/video coding of a game or the like, for example, screen content coding (SCC). IBC basically performs prediction within the current picture, but may be performed similarly to inter prediction in that a reference block is derived within the current picture. That is. IBC may use at least one of the inter prediction techniques described in the present disclosure. The palette mode may be regarded as an example of intra coding or intra prediction. When the palette mode is applied, the sample values within the picture may be signaled based on information about a palette table and a palette index.

The prediction signal generated by the predictor 320 may be used to generate a reconstructed signal or to generate a residual signal. The transformer 332 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT refers to transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to non-square blocks having a variable size.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may reorder quantized transform coefficients in a block form into a one-dimensional vector form based on a coefficient scan order and generate information on the quantized transform coefficients based on the quantized transform coefficients in the one-dimensional vector form. The entropy encoder 340 may perform various encoding methods such as, for example, exponential Golomb, context-adaptive variable length coding (CAVLC), context-adaptive binary arithmetic coding (CABAC), and the like. The entropy encoder 340 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In addition, the video/image information may further include a method of generating and using encoded information, a purpose, and the like. In the present disclosure, information and/or syntax elements transferred/signaled from the image/video encoder to the image/video decoder may be included in image/video information. The image/video information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD. CD, DVD, Blu-ray, HDD. SSD, and the like. A transmitter (not shown) transmitting a signal output from the entropy encoder 340 and/or a storage unit (not shown) storing the signal may be configured as internal/external element of the image/video encoder 300, or the transmitter may be included in the entropy encoder 340).

The quantized transform coefficients output from the quantizer 130 may be used to generate a prediction signal. For example, the residual signal (residual block or residual samples) may be reconstructed by applying dequantization and inverse transform to the quantized transform coefficients through the dequantizer 334 and the inverse transformer 335. The adder 350 adds the reconstructed residual signal to the prediction signal output from the inter predictor 321 or the intra predictor 322 to generate a reconstructed signal (reconstructed picture, reconstructed block, reconstructed sample array). In a case where there is no residual for the processing target block, such as a case where the skip mode is applied, the predicted block may be used as the reconstructed block. The adder 350 may be called a reconstructor or a reconstructed block generator. The generated reconstructed signal may be used for intra prediction of a next processing target block in the current picture and may be used for inter prediction of a next picture through filtering as described below.

Meanwhile, luma mapping with chroma scaling (LMCS) is applicable in a picture encoding and/or reconstruction process.

The filter 360 may improve subjective/objective image quality by applying filtering to the reconstructed signal. For example, the filter 360 may generate a modified reconstructed picture by applying various filtering methods to the reconstructed picture, and store the modified reconstructed picture in the memory 370, specifically, a DPB of the memory 370. The various filtering methods may include, for example, deblocking filtering, a sample adaptive offset, an adaptive loop filter, a bilateral filter, and the like. The filter 360 may generate various information related to filtering and transmit the generated information to the entropy encoder 190. The information related to filtering may be encoded by the entropy encoder 340 and output in the form of a bitstream.

The modified reconstructed picture transmitted to the memory 370 may be used as the reference picture in the inter predictor 321. Through this, prediction mismatch between the encoder and the decoder may be avoided and encoding efficiency may be improved.

The DPB of the memory 370 may store the modified reconstructed picture for use as a reference picture in the inter predictor 321. The memory 370 may store the motion information of the block from which the motion information in the current picture is derived (or encoded) and/or the motion information of the blocks in the already reconstructed picture. The stored motion information may be transferred to the inter predictor 321 for use as the motion information of the spatial neighboring block or the motion information of the temporal neighboring block. The memory 370 may store reconstructed samples of reconstructed blocks in the current picture and may transfer the stored reconstructed samples to the intra predictor 322.

Meanwhile, the VCM encoder (or feature/feature map encoder) basically performs a series of procedures such as prediction, transform, and quantization to encode the feature/feature map and thus may basically have the same/similar structure as the image/video encoder 300 described with reference to FIG. 3. However, the VCM encoder is different from the image/video encoder 300 in that the feature/feature map is an encoding target, and thus may be different from the image/video encoder 300 in the name of each unit (or component) (e.g., image partitioner 310, etc.) and its specific operation content. The specific operation of the VCM encoder will be described in detail later.

Decoder

Figure 4:
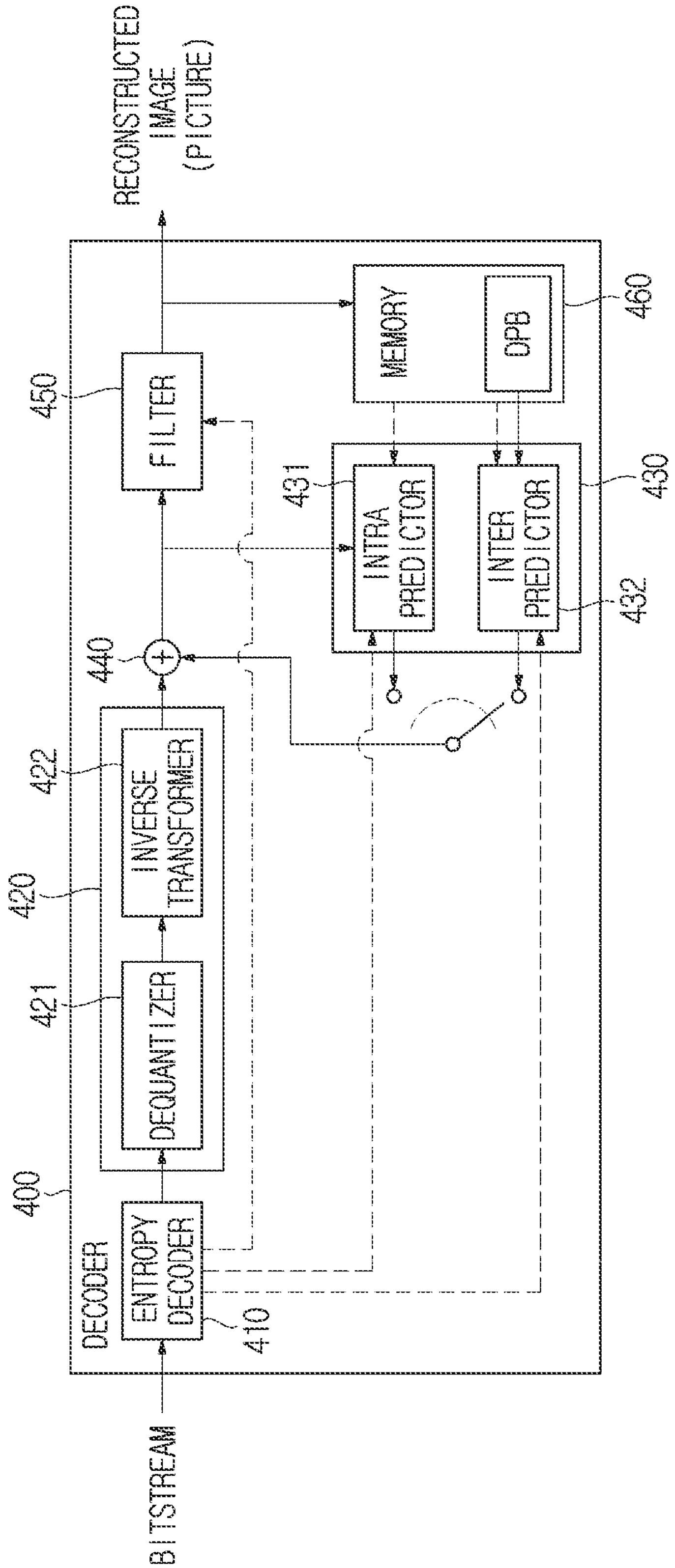
FIG. 4 is a diagram schematically showing an image/video decoder to which embodiments of the present disclosure are applicable.

FIG. 4 is a diagram schematically showing an image/video decoder to which embodiments of the present disclosure are applicable.

Referring to FIG. 4, the image/video decoder 400 may include an entropy decoder 410, a residual processor 420, a predictor 430, an adder 440, a filter 450 and a memory 460. The predictor 430 may include an inter predictor 431 and an intra predictor 432. The residual processor 420 may include a dequantizer 421 and an inverse transformer 422. The entropy decoder 410, the residual processor 420, the predictor 430, the adder 440, and the filter 450 may be configured by one hardware component (e.g., a decoder chipset or processor) depending on the embodiment. Additionally, the memory 460 may include a decoded picture buffer (DPB) and may be configured by a digital storage medium. The hardware component may further include the memory 460 as an internal/external component.

When a bitstream containing video/image information is input, the image/video decoder 400 may reconstruct an image/video in correspondence with the process in which the image/video information is processed in the image/video encoder 300 of FIG. 3. For example, the image/video decoder 400 may derive units/blocks based on block partition-related information acquired from the bitstream. The image/video decoder 400 may perform decoding using a processing unit applied in the image/video encoder. Accordingly, the processing unit of decoding may, for example, be a coding unit, and the coding unit may be partitioned from a coding tree unit or a largest coding unit according to a quad tree structure, a binary tree structure and/or a ternary tree structure. One or more transform units may be derived from the coding unit. In addition, the reconstructed image signal decoded and output through the image/video decoder 400 may be played through a playback device.

The image/video decoder 400 may receive a signal output from the encoder of FIG. 3 in the form of a bitstream, and decode the received signal through the entropy decoder 410. For example, the entropy decoder 410 may parse the bitstream to derive information (e.g., image/video information) necessary for image reconstruction (or picture reconstruction). The image/video information may further include information about various parameter sets, such as an adaptation parameter set (APS), picture parameter set (PPS), sequence parameter set (SPS), or video parameter set (VPS). Additionally, image/video information may further include general constraint information. Additionally, the image/video information may include a method of generating and using decoded information, a purpose, and the like. The image/video decoder 400 may decode the picture further based on information about the parameter set and/or general constraint information. The signaled/received information and/or syntax elements may be decoded and acquired from the bitstream through a decoding procedure. For example, the entropy decoder 410 may decode information in the bitstream based on a coding method such as exponential Golomb coding, CAVLC, or CABAC, and output the values of syntax elements necessary for image reconstruction and quantized values of transform coefficients related to residuals. More specifically, in the CABAC entropy decoding method, a bin corresponding to each syntax element may be received in the bitstream, a context model may be determined using decoding target syntax element information and decoding information of neighboring and decoding target blocks or information on the symbol/bin decoded in the previous step, the occurrence probability of the bin may be predicted according to the determined context model, and arithmetic decoding of the bin may be performed to generate a symbol corresponding to the value of each syntax element. At this time, the CABAC entropy decoding method may update the context model using the information on the decoded symbol/bin for the context model of the next symbol/bin after determining the context model. Information about prediction among the information decoded in the entropy decoder 410 is provided to the predictor (inter predictor 432 and intra predictor 431), and a residual value obtained by performing entropy decoding in the entropy decoder 410, that is, quantized transform coefficients and related parameter information may be input to the residual processor 420. The residual processor 420 may derive a residual signal (residual block, residual samples, residual sample array). Additionally, information about filtering among the information decoded by the entropy decoder 410 may be provided to the filter 450. Meanwhile, a receiver (not shown) that receives a signal output from the image/video encoder may be further configured as an internal/external element of the image/video decoder 400, or the receiver may be a component of the entropy decoder 410. Meanwhile, the image/video decoder according to the present disclosure may be called an image/video decoding apparatus, and the image/video decoder may be divided into an information decoder (image/video information decoder) and a sample decoder (image/video sample decoder). In this case, the information decoder may include an entropy decoder 410, and the sample decoder may include at least one of a dequantizer 321, an inverse transformer 322, an adder 440, a filter 450, and a memory 460, an inter predictor 432 or an intra predictor 431.

The dequantizer 421 may dequantize the quantized transform coefficients and output transform coefficients. The dequantizer 421 may rearrange the quantized transform coefficients into a two-dimensional block form. In this case, rearranging may be performed based on the coefficient scan order performed in the image/video encoder. The dequantizer 321 may perform dequantization on quantized transform coefficients using quantization parameters (e.g., quantization step size information) and acquire transform coefficients.

The inverse transformer 422 inversely transforms the transform coefficients to acquire a residual signal (residual block, residual sample array).

The predictor 430 may perform prediction on the current block and generate a predicted block including prediction samples for the current block. The predictor may determine whether intra prediction or inter prediction is applied to the current block based on information about prediction output from the entropy decoder 410, and may determine a specific intra/inter prediction mode.

The predictor 420 may generate a prediction signal based on various prediction methods. For example, the predictor may not only apply intra prediction or inter prediction for prediction of one block, but also may apply intra prediction and inter prediction simultaneously. This may be called combined inter and intra prediction (CIIP). Additionally, the predictor may be based on an intra block copy (IBC) prediction mode or a palette mode for prediction of a block. The IBC prediction mode or palette mode may be used, for example, for image/video coding of content such as games, such as screen content coding (SCC). In IBC, prediction is basically performed within the current picture, but may be performed similarly to inter prediction in that a reference block is derived within the current picture. That is. IBC may use at least one of the inter prediction techniques described in this document. The palette mode may be viewed as an example of intra coding or intra prediction. When the palette mode is applied, information about the palette table and palette index may be included and signaled in the image/video information.

The intra predictor 431 may predict the current block by referencing samples in the current picture. The referenced samples may be located in the neighbor of the current block, or may be located away from the current block, depending on the prediction mode. In intra prediction, prediction modes may include a plurality of non-directional modes and a plurality of directional modes. The intra predictor 431 may determine the prediction mode applied to the current block using the prediction mode applied to the neighboring block.

The inter predictor 432 may derive a predicted block for the current block based on a reference block (reference sample array) specified by a motion vector in the reference picture. At this time, in order to reduce the amount of motion information transmitted in the inter prediction mode, motion information may be predicted in block, subblock, or sample units based on the correlation of motion information between the neighboring block and the current block. The motion information may include a motion vector and a reference picture index. The motion information may further include inter prediction direction (L0 prediction. L1 prediction. Bi prediction, etc.) information. In the case of inter prediction, neighboring blocks may include a spatial neighboring block present in the current picture and a temporal neighboring block present in the reference picture. For example, the inter predictor 432 may construct a motion information candidate list based on neighboring blocks and derive a motion vector and/or reference picture index of the current block based on received candidate selection information. Inter prediction may be performed based on various prediction modes, and information about prediction may include information indicating the mode of inter prediction for the current block.

The adder 440 may generate a reconstructed signal (reconstructed picture, reconstructed block, reconstructed sample array) by adding the acquired residual signal to a prediction signal (predicted block, prediction sample array) output from the predictor (including the inter predictor 432 and/or the intra predictor 431). If there is no residual for a processing target block, such as when skip mode is applied, the predicted block may be used as a reconstruction block.

The adder 440 may be called a reconstructor or a reconstruction block generator. The generated reconstructed signal may be used for intra prediction of a next processing target block in the current picture, may be output after filtering as described later, or may be used for inter prediction of a next picture.

Meanwhile, luma mapping with chroma scaling (LMCS) is applicable in a picture decoding process.

The filter 450 can improve subjective/objective image quality by applying filtering to the reconstructed signal. For example, the filter 450 may generate a modified reconstructed picture by applying various filtering methods to the reconstructed picture, and transmit the modified reconstructed picture in the memory 460, specifically the DPB of the memory 460. Various filtering methods may include, for example, deblocking filtering, sample adaptive offset, adaptive loop filter, bilateral filter, etc.

The (modified) reconstructed picture stored in the DPB of the memory 460 may be used as a reference picture in the inter predictor 432. The memory 460 may store motion information of a block from which motion information in the current picture is derived (or decoded) and/or motion information of blocks in an already reconstructed picture. The stored motion information may be transferred to the inter predictor 432 for use as motion information of spatial neighboring blocks or motion information of temporal neighboring blocks. The memory 460 may store reconstructed samples of reconstructed blocks in the current picture and transfer them to the intra predictor 431.

Meanwhile, the VCM decoder (or feature/feature map decoder) performs a series of procedures such as prediction, inverse transform, and dequantization to decode the feature/feature map, and may basically have the same/similar structure as the image/video decoder 400 described above with reference to FIG. 4. However, the VCM decoder is different from the image/video decoder 400 in that the feature/feature map is a decoding target, and may be different from the image/video decoder 400 in the name (e.g., DPB, etc.) of each unit (or component) and its specific operation. The operation of the VCM decoder may correspond to the operation of the VCM encoder, and the specific operation will be described in detail later.

Feature/Feature Map Encoding Procedure

Figure 5:
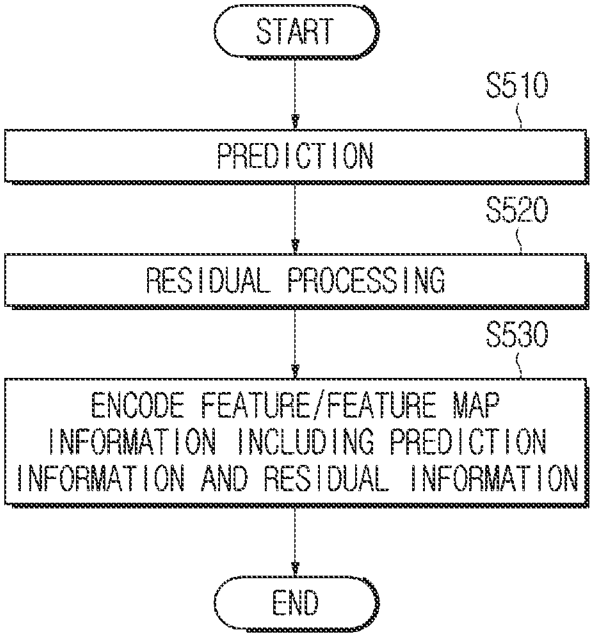
FIG. 5 is a flowchart schematically illustrating a feature/feature map encoding procedure to which embodiments of the present disclosure are applicable.

FIG. 5 is a flowchart schematically illustrating a feature/feature map encoding procedure to which embodiments of the present disclosure are applicable.

Referring to FIG. 5, the feature/feature map encoding procedure may include a prediction procedure (S510), a residual processing procedure (S520), and an information encoding procedure (S530).

The prediction procedure (S510) may be performed by the predictor 320 described above with reference to FIG. 3.

Specifically, the intra predictor 322 may predict a current block (that is, a set of current encoding target feature elements) by referencing feature elements in a current feature/feature map. Intra prediction may be performed based on the spatial similarity of feature elements constituting the feature/feature map. For example, feature elements included in the same region of interest (RoI) within an image/video may be estimated to have similar data distribution characteristics. Accordingly, the intra predictor 322 may predict the current block by referencing the already reconstructed feature elements within the region of interest including the current block. At this time, the referenced feature elements may be located adjacent to the current block or may be located away from the current block depending on the prediction mode. Intra prediction modes for feature/feature map encoding may include a plurality of non-directional prediction modes and a plurality of directional prediction modes. The non-directional prediction modes may include, for example, prediction modes corresponding to the DC mode and planar mode of the image/video encoding procedure. Additionally, the directional modes may include prediction modes corresponding to, for example, 33 directional modes or 65 directional modes of an image/video encoding procedure. However, this is an example, and the type and number of intra prediction modes may be set/changed in various ways depending on the embodiment.

The inter predictor 321 may predict the current block based on a reference block (i.e., a set of referenced feature elements) specified by motion information on the reference feature/feature map. Inter prediction may be performed based on the temporal similarity of feature elements constituting the feature/feature map. For example, temporally consecutive features may have similar data distribution characteristics. Accordingly, the inter predictor 321 may predict the current block by referencing the already reconstructed feature elements of features temporally adjacent to the current feature. At this time, motion information for specifying the referenced feature elements may include a motion vector and a reference feature/feature map index. The motion information may further include information about an inter prediction direction (e.g., L0 prediction. L1 prediction. Bi prediction, etc.). In the case of inter prediction, neighboring blocks may include spatial neighboring blocks present within the current feature/feature map and temporal neighboring blocks present within the reference feature/feature map. A reference feature/feature map including a reference block and a reference feature/feature map including a temporal neighboring block may be the same or different. The temporal neighboring block may be referred to as a collocated reference block, etc., and a reference feature/feature map including a temporal neighboring block may be referred to as a collocated feature/feature map. The inter predictor 321 may construct a motion information candidate list based on neighboring blocks and generate information indicating which candidate is used to derive the motion vector and/or reference feature/feature map index of the current block. Inter prediction may be performed based on various prediction modes. For example, in the case of the skip mode and the merge mode, the inter predictor 321 may use motion information of the neighboring block as motion information of the current block. In the case of the skip mode, unlike the merge mode, the residual signal may not be transmitted. In the case of the motion vector prediction (MVP) mode, the motion vector of the neighboring block is used as a motion vector predictor, and the motion vector of the current block may be indicated by signaling the motion vector difference. The predictor 320 may generate a prediction signal based on various prediction methods in addition to intra prediction and inter prediction described above.

The prediction signal generated by the predictor 320 may be used to generate a residual signal (residual block, residual feature elements) (S520). The residual processing procedure (S520) may be performed by the residual processor 330 described above with reference to FIG. 3. In addition. (quantized) transform coefficients may be generated through a transform and/or quantization procedure for the residual signal, and the entropy encoder 340 may encode information about the (quantized) transform coefficients in the bitstream as residual information (S530). Additionally, the entropy encoder 340 may encode information necessary for feature/feature map reconstruction, such as prediction information (e.g., prediction mode information, motion information, etc.), in the bitstream, in addition to the residual information.

Meanwhile, the feature/feature map encoding procedure may further include not only a procedure (S530) for encoding information for feature/feature map reconstruction (e.g., prediction information, residual information, partitioning information, etc.) and outputting it in the form of a bitstream, a procedure for generating a reconstructed feature/feature map for the current feature/feature map and a procedure (optional) for applying in-loop filtering to the reconstructed feature/feature map.

The VCM encoder may derive (modified) residual feature(s) from the quantized transform coefficient(s) through dequantization and inverse transform, and generate a reconstructed feature/feature map based on the predicted feature(s) and (modified) residual feature(s) that are the output of step S510. The reconstructed feature/feature map generated in this way may be the same as the reconstructed feature/feature map generated in the VCM decoder. When an in-loop filtering procedure is performed on the reconstructed feature/feature map, a modified reconstructed feature/feature map may be generated through the in-loop filtering procedure on the reconstructed feature/feature map. The modified reconstructed feature/feature map may be stored in a decoded feature buffer (DFB) or memory and used as a reference feature/feature map in the feature/feature map prediction procedure later. Additionally. (in-loop) filtering-related information (parameters) may be encoded and output in the form of a bitstream. Through the in-loop filtering procedure, noise that may occur during feature/feature map coding may be removed, and feature/feature map-based task performance may be improved. In addition, by performing an in-loop filtering procedure at both the encoder stage and the decoder stage, the identity of the prediction result can be guaranteed, the reliability of feature/feature map coding can be improved, and the amount of data transmission for feature/feature map coding can be reduced.

Feature/Feature Map Decoding Procedure

Figure 6:
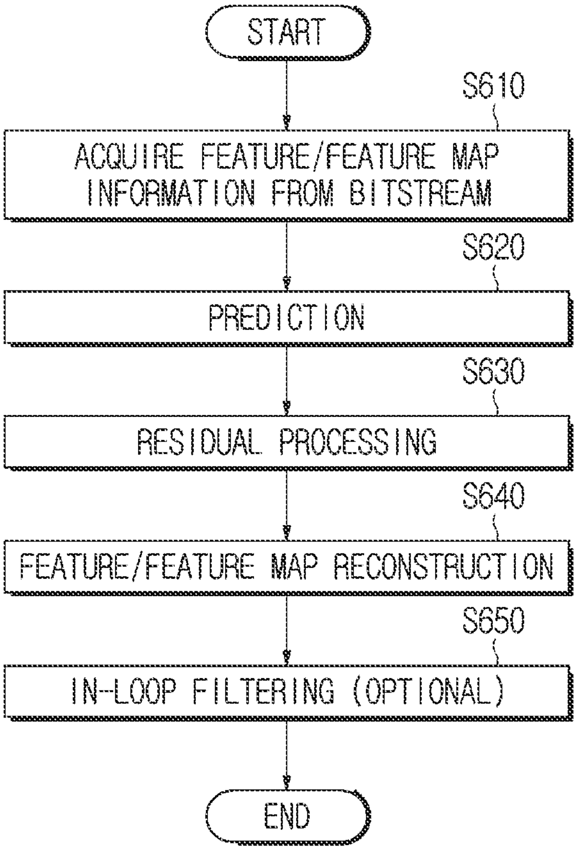
FIG. 6 is a flowchart schematically illustrating a feature/feature map decoding procedure to which embodiments of the present disclosure are applicable.

FIG. 6 is a flowchart schematically illustrating a feature/feature map decoding procedure to which embodiments of the present disclosure are applicable.

Referring to FIG. 6, the feature/feature map decoding procedure may include an image/video information acquisition procedure (S610), a feature/feature map reconstruction procedure (S620 to S640), and an in-loop filtering procedure for a reconstructed feature/feature map (S650). The feature/feature map reconstruction procedure may be performed on the prediction signal and residual signal acquired through inter/intra prediction (S620) and residual processing (S630), dequantization and inverse transform process for quantized transform coefficients described in the present disclosure. A modified reconstructed feature/feature map may be generated through an in-loop filtering procedure for the reconstructed feature/feature map, and the modified reconstructed feature/feature map may be output as a decoded feature/feature map. The decoded feature/feature map may be stored in a decoded feature buffer (DFB) or memory and used as a reference feature/feature map in the inter prediction procedure when decoding the feature/feature map. In some cases, the above-described in-loop filtering procedure may be omitted. In this case, the reconstructed feature/feature map may be output without change as a decoded feature/feature map, and stored in the decoded feature buffer (DFB) or memory, and then be used as a reference feature/feature map in the inter prediction procedure when decoding the feature/feature map.

Feature Extraction Method and Data Distribution Characteristics

Figure 7:
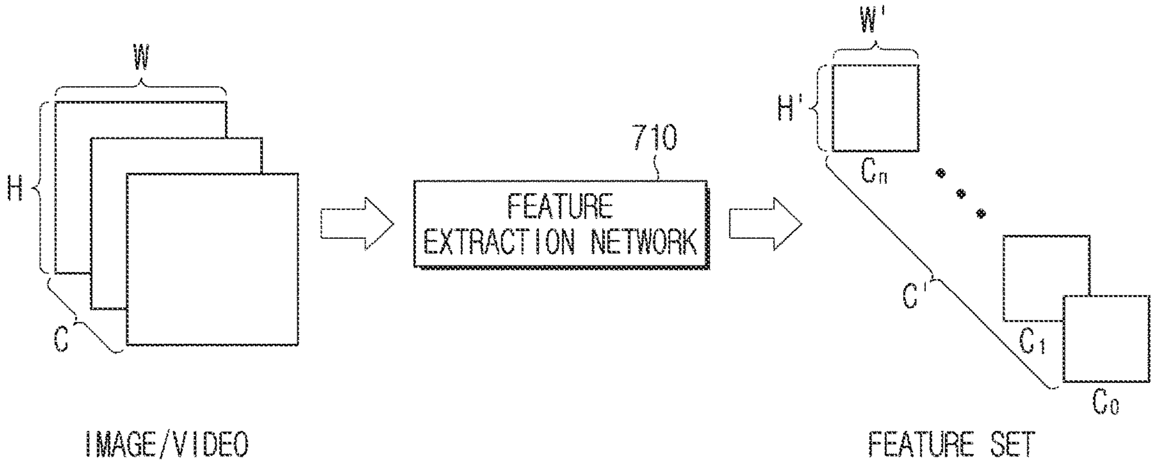
FIG. 7 is a diagram showing an example of a feature extraction method using a feature extraction network.

FIG. 7 is a diagram illustrating an example of a feature extraction method using a feature extraction network.

Referring to FIG. 7, the feature extraction network 700 may receive a video source 710 and perform a feature extraction operation to output a feature set 720 of the video source 710. The feature set 720 may include a plurality of features $C_0, C_1, \ldots, C_n$ extracted from the video source 710, and may be expressed as a feature map. Each feature $C_0$, $C_1, \ldots . C_n$ includes a plurality of feature elements and may have different data distribution characteristics.

In FIG. 7, W, H, and C may mean the width, height, and number of channels of the video source 710, respectively. Here, the number C of channels of the video source 710 may be determined based on the image format of the video source 710. For example, when the video source 710 has an RGB image format, the number C of channels of the video source 710 may be 3.

Additionally. W', H', and C' may mean the width, height, and number of channels of the feature set 720, respectively. The number C' of channels of the feature set 720 may be equal to the total number (n+1) of features $C_0, C_1, \ldots . C_n$ extracted from the video source 710. In one example, the number C' of channels of the feature set 720 may be greater than the number C of channels of the video source 710.

The properties W', H', C' of the feature set 720 may vary depending on the properties W. H. C of the video source 710. For example, as the number C of channels of the video source 710 increases, the number C' of channels of the feature set 720 may also increase. Additionally, the properties W', H', C' of the feature set 720 may vary depending on the type and properties of the feature extraction network 700. For example, if the feature extraction network 700 is implemented as an artificial neural network (e.g., CNN, DNN, etc.), the properties W'. H'. C' of the feature set 720 may also vary according to the location of the layer outputting each feature $C_0, C_1, \ldots, C_n$.

The video source 710 and the feature set 720 may have different data distribution characteristics. For example, the video source 710 may generally consist of one (grayscale image) channel or three (RGB image) channels. Pixels included in the video source 710 may have the same integer value range for all channels and may have non-negative values. Additionally, each pixel value may be evenly distributed within a predetermined integer value range. On the other hand, the feature set 720 may be composed of a various number of channels (e.g., 32, 64, 128, 256, 512, etc.) depending on the type of feature extraction network 700 (e.g., CNN. DNN, etc.) and layer location. Feature elements included in the feature set 720 may have different real value ranges for each channel and may also have negative values. Additionally, each feature element value may be intensively distributed in a specific area within a predetermined real value range.

Figure 8A:
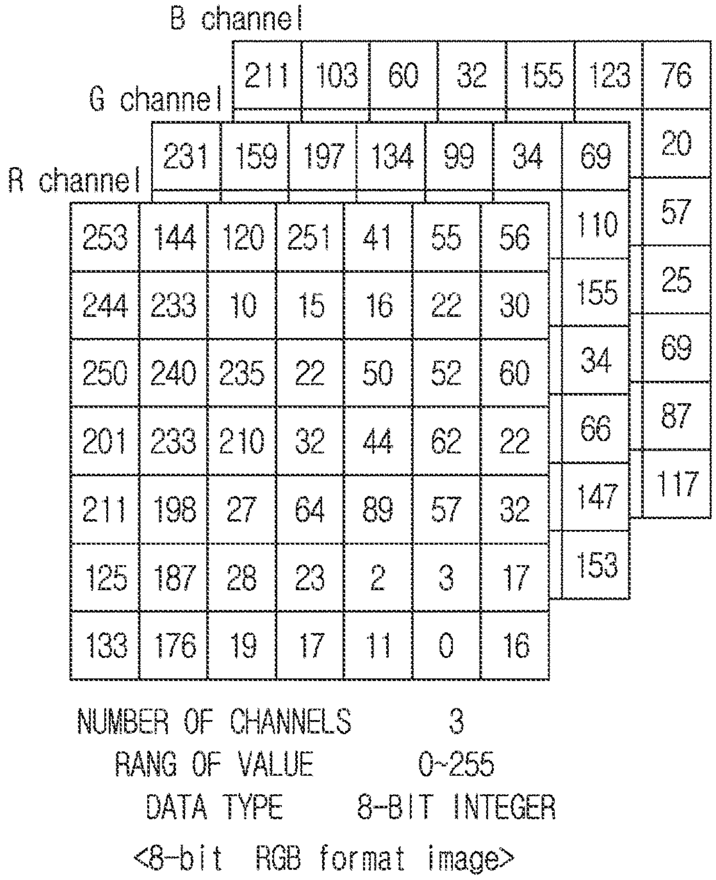
FIG. 8*a* is a diagram showing the data distribution characteristics of a video source.
Figure 8B:
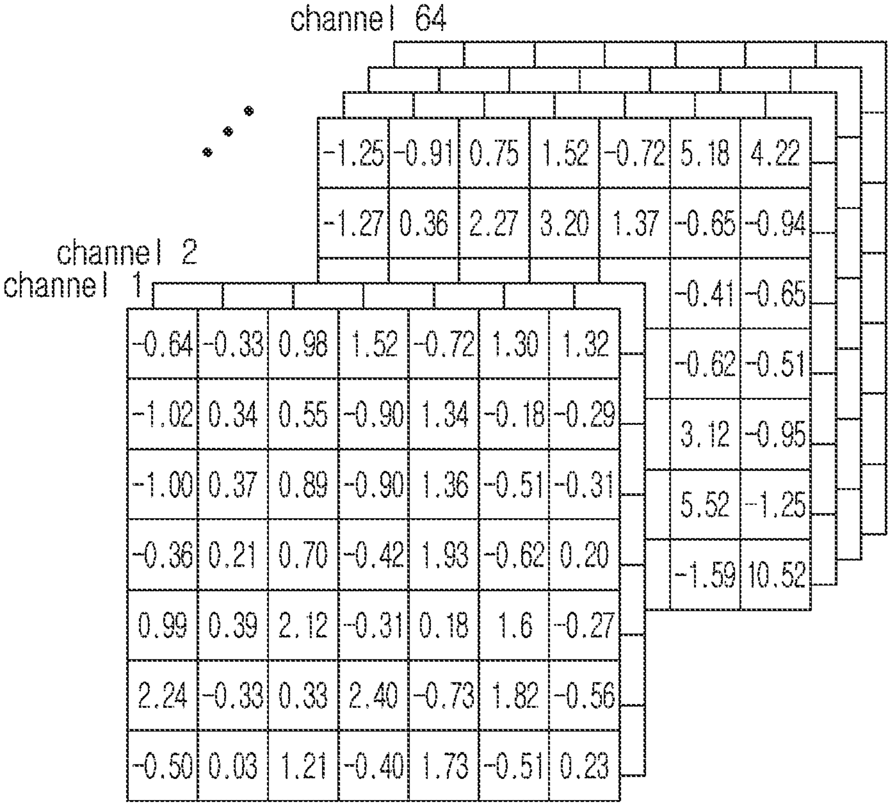
FIG. 8*b* is a diagram showing the data distribution characteristics of a feature set.

FIG. 8*a* is a diagram showing the data distribution characteristics of a video source, and FIG. 8*b* is a diagram showing the data distribution characteristics of a feature set.

First, referring to FIG. 8*a*, the video source consists of a total of three channels, R, G, and B, and each pixel value may have an integer value range from 0 to 255. In this case, the data type of the video source may be expressed as an 8-bit integer type.

In contrast, referring to FIG. 8*b*, the feature set consists of 64 channels (features), and each feature element value may have a real value range from $-\infty$ to $+\infty$. In this case, the data type of the feature set may be expressed as a 32-bit floating point type.

A feature set may have feature element values of floating point type, and may have different data distribution characteristics for each channel (or feature). An example of data distribution characteristics for each channel of the feature set is shown in Table 1.

TABLE 1

| Channel | Average(μ) | Standard derivation(σ) | Max | Min |
|---|---|---|---|---|
| $C_0$ | 10 | 20 | 90 | 60 |
| $C_1$ | 30 | 10 | 70.5 | −70.2 |
| | | . . . | | |
| $C_n$ | 100 | 5 | 115.8 | 80.2 |

Referring to Table 1, the feature set may consist of a total of n+1 channels $C_0, C_1, \ldots, C_n$. The average value μ, standard deviation σ, maximum value Max, and minimum value Min of the feature elements may be different for each channel $C_0, C_1, \ldots, C_n$. For example, the average value μ of the feature elements included in channel 0 $C_0$ may be 10, the standard deviation σ may be 20, the maximum value Max may be 90, and the minimum value Min may be 60. Additionally, the average value μ of the feature elements included in channel 1 $C_1$ may be 30, the standard deviation σ may be 10, the maximum value Max may be 70.5, and the minimum value Min may be −70.2. Additionally, the average value μ of the feature elements included in the n-th channel $C_n$ may be 100, the standard deviation σ may be 5, the maximum value Max may be 115.8, and the minimum value Min may be 80.2.

Quantization of the feature/feature map may be performed, for example, based on different data distribution characteristics for each channel described above. Feature/feature map data of floating point type may be transformed into integer type through quantization.

Meanwhile, due to spatiotemporal similarity between consecutive frames, feature sets and/or channels consecutively extracted from a video source may have the same/similar data distribution characteristics. An example of the data distribution characteristics of consecutive feature sets is shown in Table 2.

TABLE 2

| Feature set | Average(μ) | Standard derivation(σ) | Max | Min |
|---|---|---|---|---|
| $f_{F0}$ | 50 | 10 | 110.5 | 10.7 |
| $f_{F1}$ | 52 | 11 | 120.5 | 11.5 |
| $f_{F2}$ | 53 | 10 | 115 | 5 |

In Table 2, fro means a first feature set extracted from Frame 0 (F0), $f_{F1}$ means a second feature set extracted from frame 1 (F1), and $f_{F2}$ means a third feature set extracted from Frame 2 (F2).

Referring to Table 2, the consecutive first to third feature sets $f_{F0}$, $f_{F1}$ and $f_{F2}$ have the same/similar average value μ, standard deviation σ, maximum value Max and minimum value Min.

Also, due to the spatiotemporal similarity between consecutive frames, corresponding channels in feature sets consecutively extracted from a video source may have the same/similar data distribution characteristics. An example of the data distribution characteristics of corresponding channels of the consecutive feature sets is as shown in Table 3.

TABLE 3

| Feature set | Average(μ) | Standard derivation(σ) | Max | Min |
|---|---|---|---|---|
| $f_{F0C0}$ | 40 | 10 | 110.5 | 10.7 |
| $f_{F1C0}$ | 40 | 11 | 111.5 | 11.5 |

In Table 3, $f_{F0C0}$ means a first channel in a first feature set extracted from Frame ((F0), and $f_{F1C0}$ means a first channel in a second feature set extracted from Frame 1 (F1).

Referring to Table 3, the first channel $f_{F0C0}$ in the first feature set and the second channel $f_{F1C0}$ in the second feature set corresponding thereto have the same/similar average value μ, standard deviation σ, maximum value Max, and minimum value Min.

Prediction of the feature/feature map may be performed, for example, based on the similarity of data distribution characteristics between the above-described feature sets or channels.

Existing image/video compression technology recognizes the number of components in advance according to a predefined image format such as YUV or RGB and configures a bitstream based on this. In addition, existing image/video compression technology is designed to perform image/video compression using hybrid compression technology for a minimum of 1 to a maximum of 3 components depending on the image format. In this process, a transform/coding level is determined through a coding structure called block partitioning.

However, a feature map, which is an encoding/decoding target of VCM, consists of a plurality of channels, and the number of channels may vary depending on the type of (feature extraction) network. Therefore, it is inappropriate to apply the existing image/video compression technology to feature map encoding without change, and design changes are inevitable. Meanwhile, the number of channels in the feature map is variable depending on the network, but the N channels that make up one feature tensor are data extracted at the same time period, so correlations between channels may exist depending on the depth of the network. Accordingly, in the present disclosure, a method of referencing/predicting an inter-channel coding structure based on such channel characteristics is proposed.

Next, depending on the network structure, the size of the feature map that is the encoding/decoding target of VCM may be significantly larger than that of a general image/video. In this case, feature data, which is input data, has an absolutely larger data amount than existing image/video input data. Additionally, since the feature map is obtained through a non-linear network, spatial/temporal similarity may be lower than that of the existing image/video. In other words, in the case of the feature map, the correlation required for an efficient compression process is lower than that of the existing image/video, but the amount of data is relatively large, resulting in a problem of lower compression efficiency compared to image/video input data. Accordingly, in the present disclosure, a method of sub-sampling and/or up-sampling a feature map is proposed. Hereinafter, embodiments of the present disclosure will be described in detail with reference to the attached drawings.

Embodiment 1

Embodiment 1 of the present disclosure relates to a method of predicting a coding structure (or partitioning structure) of each channel by referencing a coding structure of a previous channel that has already been encoded/decoded in a process of compressing feature data extracted from a network.

Figure 9:
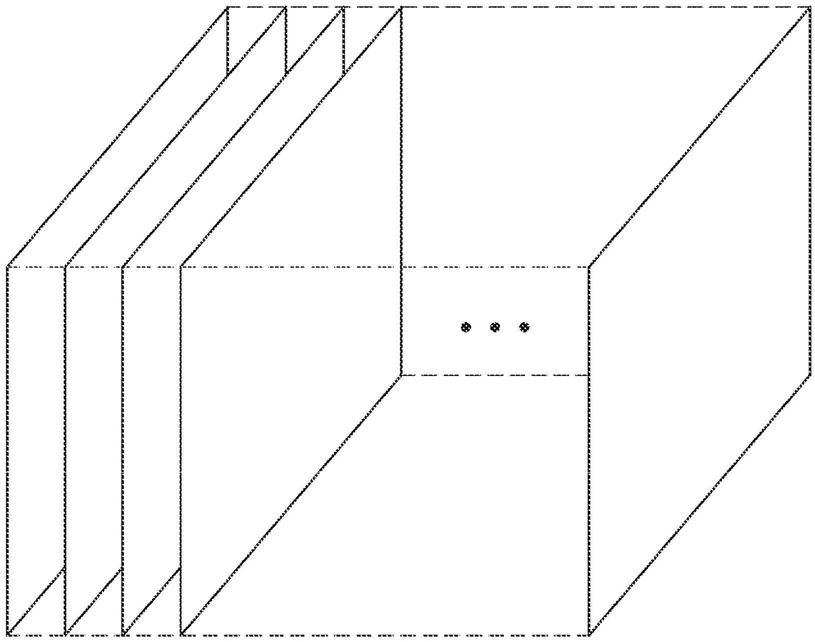
FIG. 9 is a diagram showing an example of a feature tensor extracted from an arbitrary network.

FIG. 9 is a diagram showing an example of a feature tensor extracted from an arbitrary network.

Referring to FIG. 9, a feature tensor (or feature map) may be composed of a plurality of channels. At this time, each channel is an encoding/decoding unit, and compression may be performed without a preprocessing process of packing multiple channels into one frame. That is, N encoding/decoding may be performed on a feature tensor composed of N channels. In this structure, correlation between channels may exist depending on the depth of the network. In general, in a layer of a low-depth network, a feature tensor is extracted with relatively little non-linear processing performed, so correlation between channels may remain. In this case, since the channels are obtained from image/video information in the same time period, they may have similar coding structures. For example, if each channel of the feature tensor in FIG. 9 is compressed, it may have a coding structure shown in FIG. 10.

Figure 10:
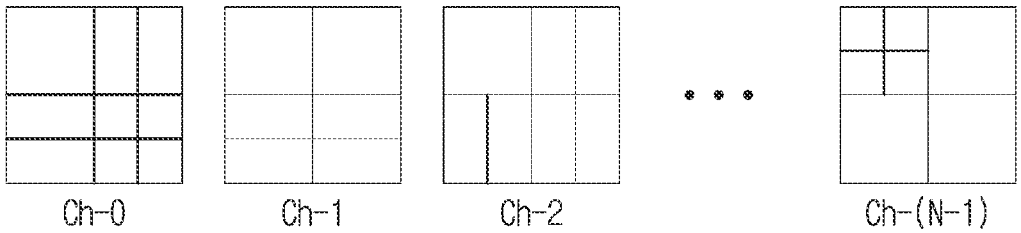
FIG. 10 is a diagram showing an example of a coding structure for each channel of a feature tensor.

Referring to FIG. 10, it can be seen that, in the coding structure of each channel, when viewed from channel #0, the coding structure indicated by a thin line is the same, and the coding structure indicated by a thick line is different. In other words, the coding structure of each channel is different overall, but partially the same in detail, so it can be confirmed that there is similarity in the coding structure between channels. According to Embodiment 1 of the present disclosure, the coding structure of a current channel may be determined with reference to the coding structure of a previous channel based on such channel characteristics.

Figure 11:
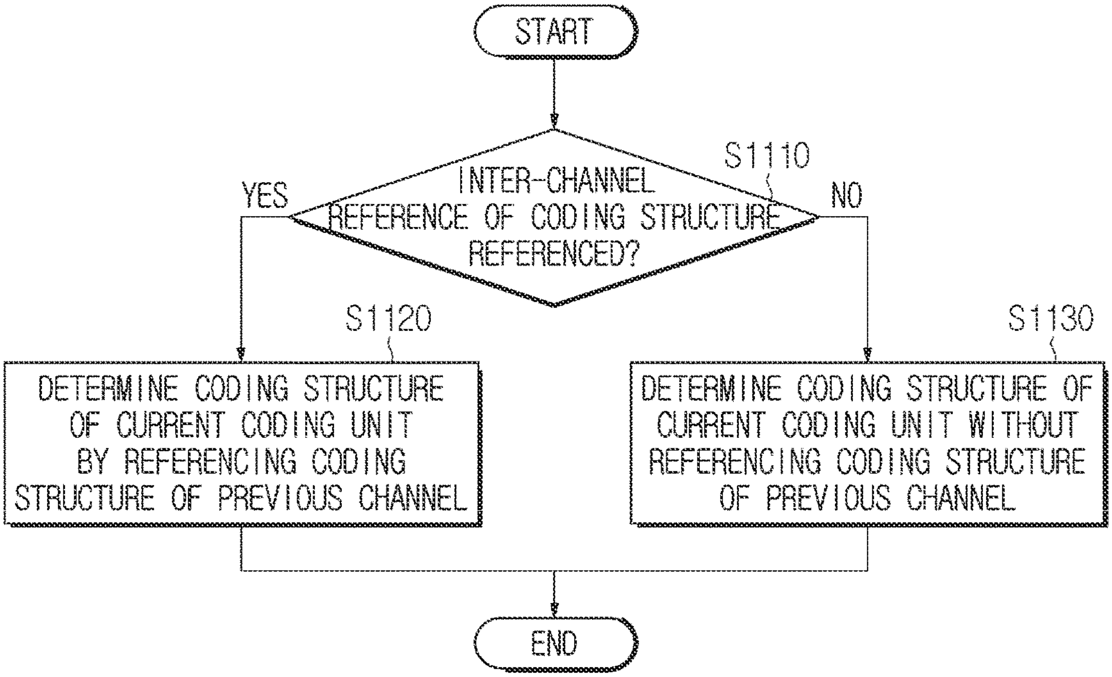
FIG. 11 is a flowchart showing a method of determining a channel coding structure according to an embodiment of the present disclosure.

FIG. 11 is a flowchart showing a method of determining a channel coding structure according to an embodiment of the present disclosure. The method of FIG. 11 may be performed by a feature encoder or a feature decoder. Hereinafter, for convenience of explanation, the method of FIG. 11 will be described based on the feature decoder.

Referring to FIG. 11, the feature decoder may determine whether to reference (or inherit) the coding structure of a previously reconstructed channel (S1110), in determining the coding structure (or split structure) of a current coding unit in a channel. Whether to reference inter-channel reference of the coding structure may be determined based on correlation between channels. For example, when the correlation between channels is high (e.g., when a difference in feature average values between channels is smaller than a predetermined threshold), a reference relationship in the coding structure may be established. On the other hand, when the correlation between channels is low (e.g., when the difference in feature average values between channels is greater than the predetermined threshold), the reference relationship in the coding structure may not be established. The feature decoder may directly determine whether to reference the coding structure by calculating the correlation between channels, or determine whether to reference the coding structure based on inter-channel reference information (e.g., root_inherit_st_flag, child_inherit_st_flag) obtained from a bitstream.

Upon determining that the coding structure of the previous channel is referenced ("YES" in S1110), the feature decoder may determine the coding structure of the current coding unit using the coding structure of the previous channel (S1120). That is, the coding structure of the current coding unit may be determined to be the same as that of the previous channel. For example, if the coding unit corresponding to the current coding unit in the previous channel is a final coding unit that is no longer split, the current coding unit may no longer be split. Here, the corresponding coding unit refers to a coding unit that exists at the same position as or at the position corresponding to the current coding unit in the previous channel. Alternatively, if the corresponding coding unit is not the final coding unit, the current coding unit may be further split in the same manner as the corresponding coding unit.

Upon determining that the coding structure of the previous channel is not referenced ('NO' in S1110), the feature decoder may determine the coding structure of the current coding unit without referencing the coding structure of the previous channel (S1130). The determination may be made based on predetermined coding structure information obtained from the bitstream. Here, the coding structure information refers to the split information of the current coding unit, and may include first information indicating whether to split, and second information indicating a split structure (e.g., QT. BT, TT, etc.) and a split direction (e.g., horizontal/vertical, etc.).

Figure 12:
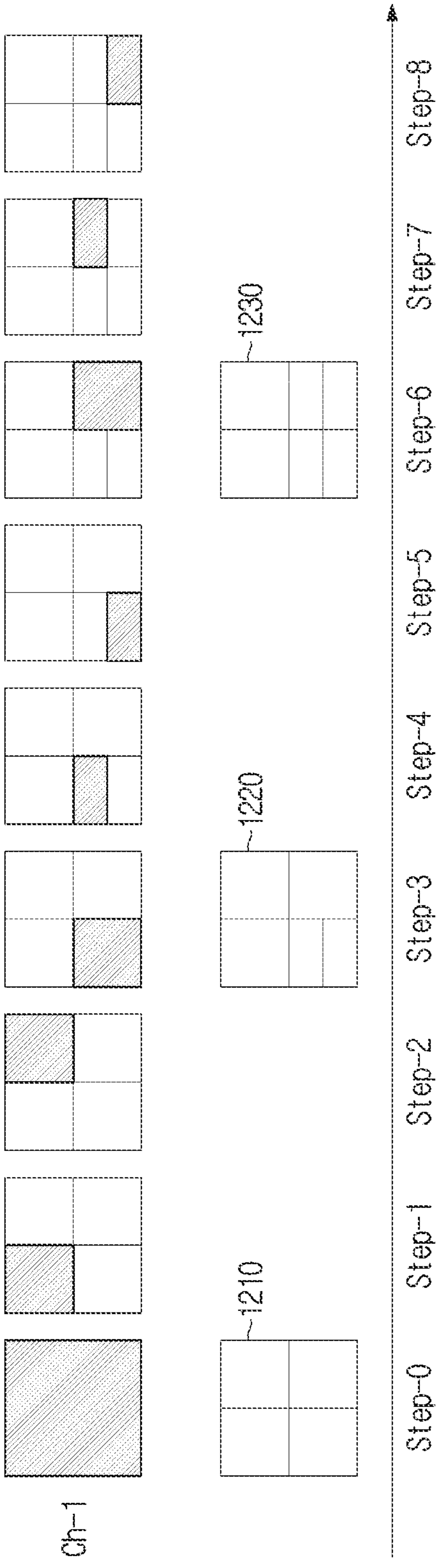
FIG. 12 shows a process of determining a coding structure of channel 1 in the example of FIG. 10.

Meanwhile, the above-described method may be repeatedly performed until all coding units in the channel are determined to be the final coding unit. An example of the above-described method is shown in FIG. 12. FIG. 12 shows a process of determining a coding structure of channel 1 according to the Z-scan order under the assumption that encoding/decoding of channel 0 has been completed in the example of FIG. 10.

Referring to FIG. 12, in Step-0, the coding structure of the entire area of channel 1 (shaded) may be determined to be a quad tree structure with reference to the coding structure of channel 0. Accordingly, the entire area of channel 1 may be split into quad tree structures as in Step-1 (1210).

In Step-1 and Step-2, the coding structure of each of the first and second coding units (shaded) of channel 1 may be set to be the same as the corresponding coding unit of channel ( ) (i.e., inter-channel reference). Accordingly, each of the first and second coding units may be determined to be the final coding unit without being further split.

In Step-3, the coding structure of the third coding unit (shaded) of channel 1 may be set to be the same as the corresponding coding unit of channel 0 (i.e., inter-channel reference). Accordingly, the third coding unit may be split into horizontal binary structures (1220).

In Step-4 and Step-5, the coding structure of each of the upper and lower coding units (shaded) of the binary-split third coding unit may be set to be the same as the corresponding coding unit of channel 0 (i.e., inter-channel reference). Accordingly, each of the upper and lower coding units may be determined to be the final coding unit without being further split.

In Step-6, inter-channel reference may not be applied to the fourth coding unit (shaded) of channel 1. Accordingly, the fourth coding unit may be split into horizontal binary structures based on the coding structure information (1230).

In Step-7 and Step-8, inter-channel reference may not be applied to each of the upper and lower coding units of the binary-split fourth coding unit. Accordingly, each of the upper and lower coding units may be determined to be a final coding unit without being further split based on the coding structure information.

Figure 13:
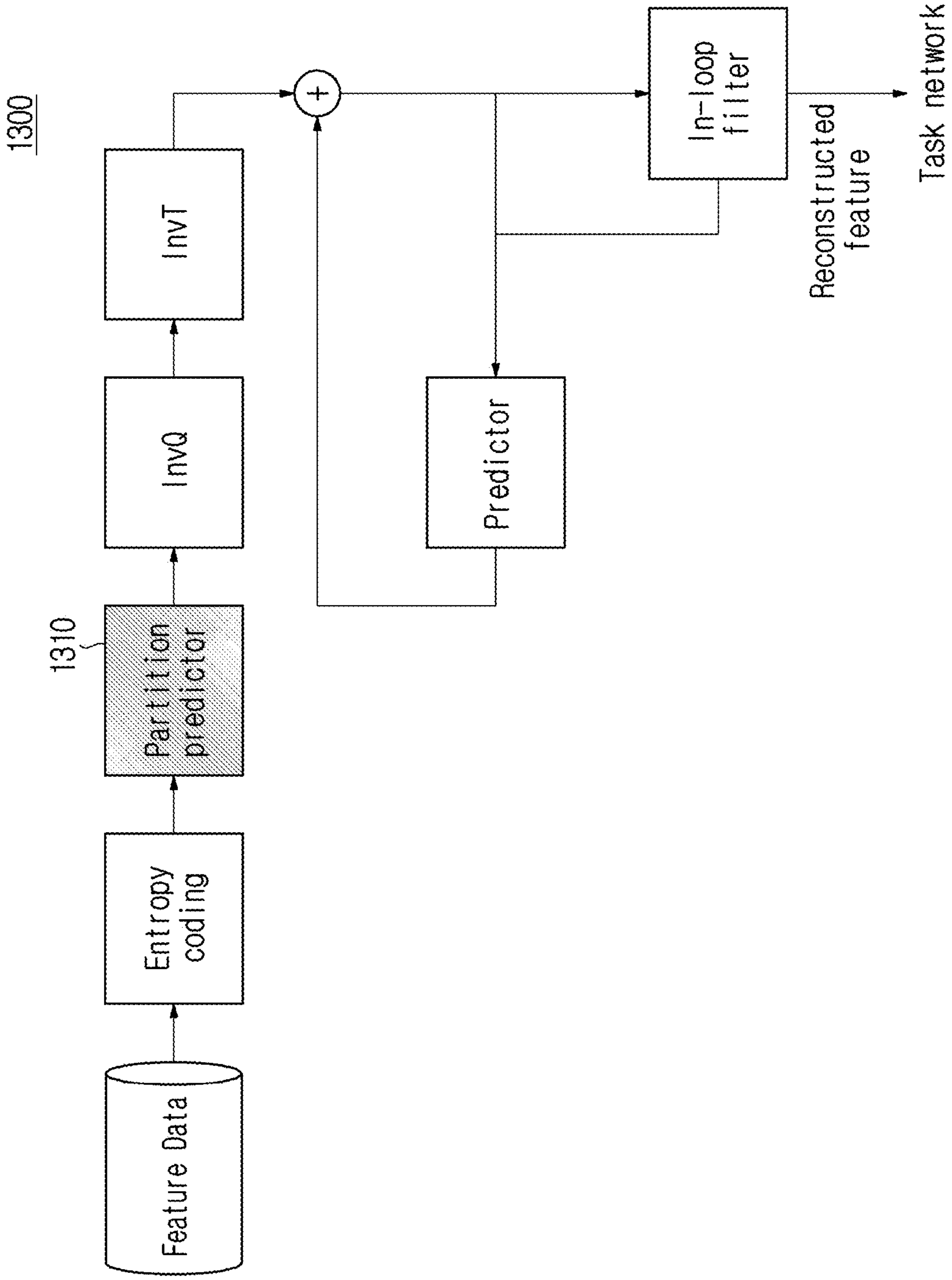
FIG. 13 is a diagram showing the structure of a feature decoder according to an embodiment of the present disclosure.

FIG. 13 is a diagram showing the structure of a feature decoder according to an embodiment of the present disclosure. Referring to FIG. 13, a partition predictor 1310 may be added to the decoder 1300 with an existing hybrid structure in order to perform the above-described coding structure determination method. The partition predictor 1310 may be placed between an entropy decoder and an inverse transform unit, and may perform a function of predicting a channel coding structure based on inter-channel reference information included in a bitstream. The feature decoder 1300 may perform a transform/prediction/decoding process based on the channel coding structure determined by the method described above.

As described above, according to Embodiment 1 of the present disclosure, by determining the coding structure of the current channel with reference to the coding structure of the previous channel, there is no need to additionally encode/decode the coding structure information, thereby saving the number of bits and further improving coding efficiency.

Embodiment 2

Embodiment 2 of the present disclosure relates to syntax for supporting reference/prediction of an inter-channel coding structure.

FIG. 14 is a diagram showing coding_feature_unit syntax according to an embodiment of the present disclosure. Referring to FIG. 14, the coding_feature_unit syntax is syntax for encoding each channel constituting one feature tensor (or feature map). In the syntax, a variable N represents the total number of channels constituting the feature tensor, and the coding_channel_unit syntax is called N times to encode each channel.

FIG. 15 is a diagram showing channel_coding_unit syntax according to an embodiment of the present disclosure.

Referring to FIG. 15, the channel_coding_unit syntax may include syntax elements pred_st_idx, root_inherit_st_flag, and child_inherit_st_flag.

The syntax element pred_st_idx may specify index information of a reference channel. Here, the reference channel may mean a channel for which encoding/decoding has already been completed, or a channel for which syntax decoding for the coding structure has been performed.

The syntax element root_inherit_st_flag may specify whether the entire coding structure of the current block is encoded identically to the structure of the reference channel. For example, when the value of root_inherit_st_flag is a first value (e.g., 1), the current block may be encoded with the same structure as the coding structure of the reference channel without additional syntax signaling.

The syntax element child_inherit_st_flag may specify whether the substructure of the current block is the same as the reference channel. For example, child_inherit_st_flag may be used to specify a case where the value of root_inherit_st_flag is a second value (e.g., 0), that is, a case where the reference channel and the overall coding structure are different, but the higher structure may be similar.

pred_st_idx, root_inherit_st_flag and child_inherit_st_flag may correspond to the inter-channel reference information of Embodiment 1 described above.

In addition, within the channel_coding_unit syntax, the channel_coding_tree syntax may be called using the coordinates of the current block and the above-described root inherit_st_flag and child_inherit_st_flag as call input values.

FIG. 16 is a diagram illustrating channel_coding_tree syntax according to an embodiment of the present disclosure.

Referring to FIG. 16, the channel_coding_tree syntax is a function that recursively calls a process of split into sub-blocks to perform actual block-unit coding. The channel_coding_tree syntax may include syntax elements child_inherit_st_flag and child_st_information.

The semantics of the syntax element child inherit_st_flag are as described above. However, child_inherit_st_flag, unlike child_inherit_st_flag called in channel_coding_unit syntax, specifies whether or not there is an inter-channel reference to a sub-block, which is a lower structure. In other words, the channel_coding_tree syntax may be called recursively using the child_inherit_st_flag signaled in the channel_coding_tree syntax as a call input value.

The syntax element child_st_information may specify which block structure it has when parent_inherit_st_flag received from the higher structure is 0, that is, when a different coding structure from the reference channel is used from a current block, child_st_information may correspond to the coding structure information of Embodiment 1 described above.

As described above, according to Embodiment 2 of the present disclosure, a plurality of hierarchically defined syntaxes may be provided to predict the coding structure of the current channel with reference to the coding structure of the previous channel. Accordingly, coding efficiency can be further improved.

Embodiment 3

Figure 17A:
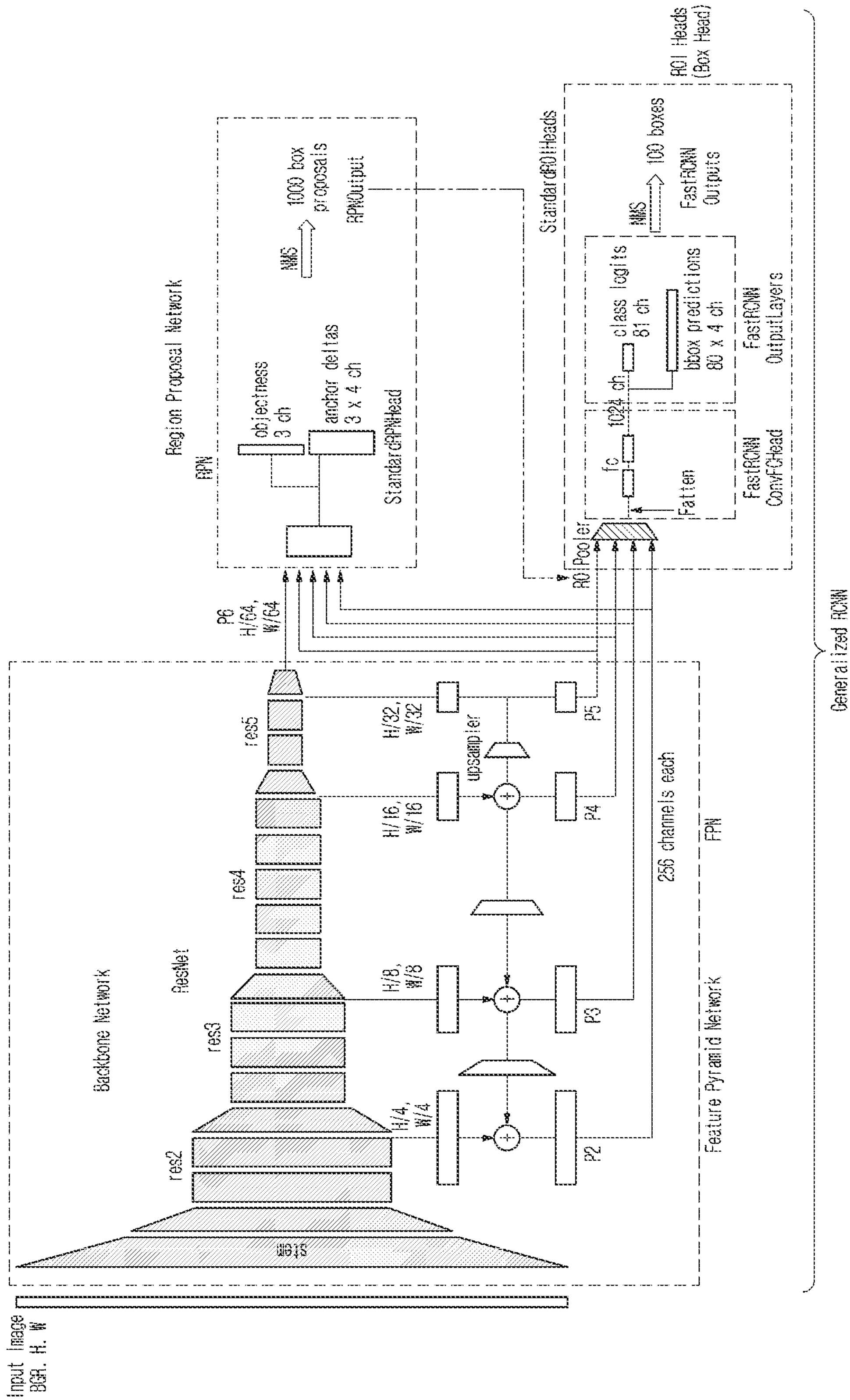
FIG. 17*a* is a diagram of a network structure of Detectron2.
Figure 17B:
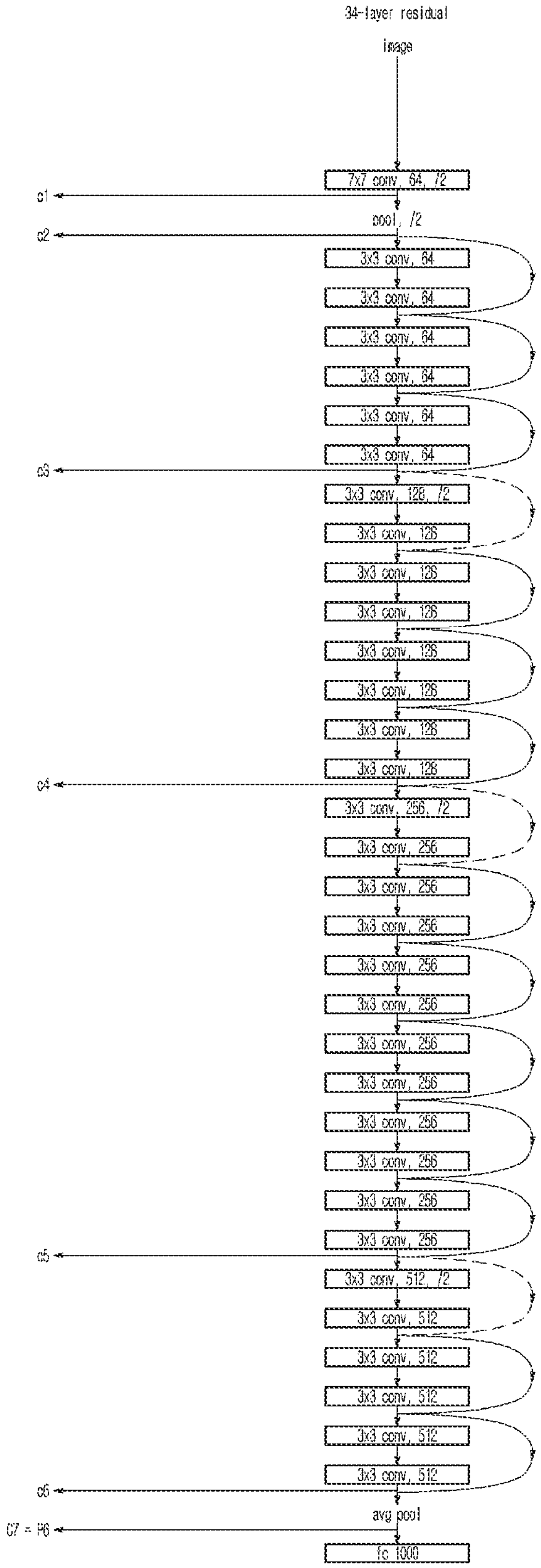
FIG. 17*b* is a diagram of a ResNet layer part of FIG. 17*a*.
Figure 17C:
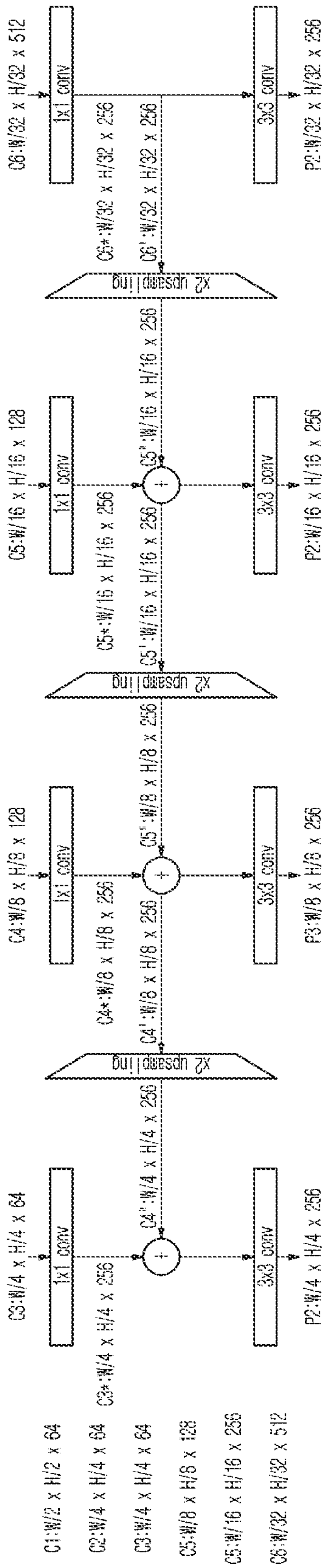
FIG. 17*c* is a diagram of an FPN part in the ResNet layer of FIG. 17*b*.

Unlike existing video codecs aimed at human vision, market needs for machine tasks and human vision are increasing with the development of artificial intelligence/machine learning. However, existing image/video compression technology may not satisfy required throughput or latency because a reception end must fully perform the machine task. To solve this problem, when feature data, which is intermediate data of the machine task, is encoded/decoded, the reception end does not completely perform the machine task, but only performs some layers that are performed using the transmitted data as input, thereby satisfying the same needs. However, the network-dependent feature data of machine tasks is likely to have a larger absolute data amount than an image/video. For example. FIG. 17*a* is a diagram of a network structure of Detectron2, and FIG. 17*b* is a detailed diagram of a ResNet layer part of FIG. 17*a*, showing the input/output and network type of each layer. In addition, FIG. 17*c* is a detailed diagram of an FPN part that concatenates internal features in a pyramid shape in the ResNet layer of FIG. 17*b*, showing the size of each input and output. Referring to the example network above, if the size of the input image has a size of 3-channel W×H, although the number of required channel may vary depending on the feature extraction point, it can be seen that 64 channels are required in the stem layer and weighted feature data is required in in an FPN channel. In other words, the amount of feature data becomes absolutely larger than the input image. If any encoder has the same compression efficiency when receiving a video and feature, it will have relatively low coding efficiency due to the large amount of feature data. To solve this problem, according to the following embodiments, feature data may be compressed and transmitted after being sub-sampled at an encoder stage, and may be up-sampled after being decoded at a decoder stage.

Embodiment 3 of the present disclosure relates to a sub-sampling method of feature data. The sub-sampling may be performed considering quantization/normalization of feature data. At this time, quantization/normalization is considered because feature data is basically floating-point data, and input bits must be adjusted through quantization and normalization for compression efficiency.

Figure 18:
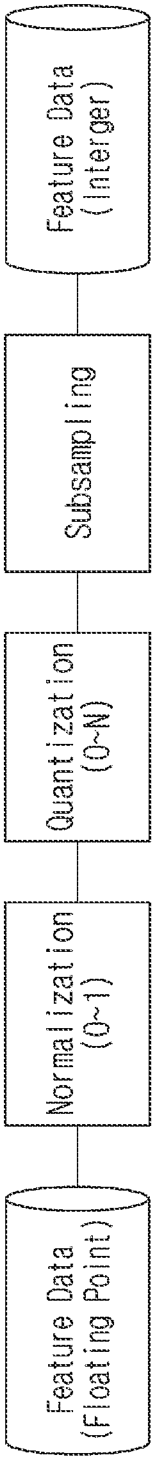
FIGS. 18 and 19 are diagrams for explaining a sub-sampling method of feature data according to an embodiment of the present disclosure.
Figure 19:
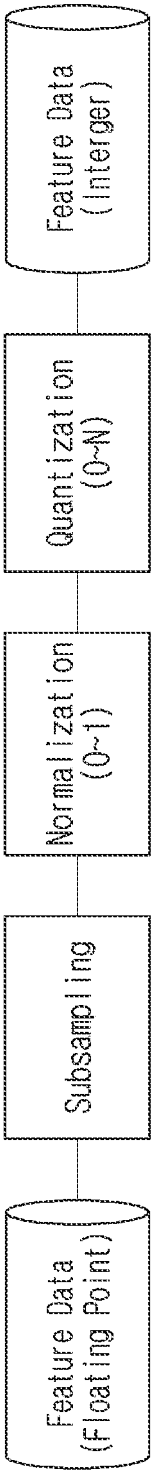

FIGS. 18 and 19 are diagrams for explaining a sub-sampling method of feature data according to an embodiment of the present disclosure.

Referring first to FIG. 18, in one embodiment, sub-sampling of feature data may be performed after normalization and quantization processes. By performing sub-sampling on normalized and quantized feature data, compression efficiency can be further improved at the expense of spatial errors between data.

Next, referring to FIG. 19, in another embodiment, sub-sampling of feature data may be performed prior to normalization and quantization processes. By performing sub-sampling on feature data that has not been normalized or quantized, spatial errors between data can be further reduced compared to the case of FIG. 18.

Figure 20:
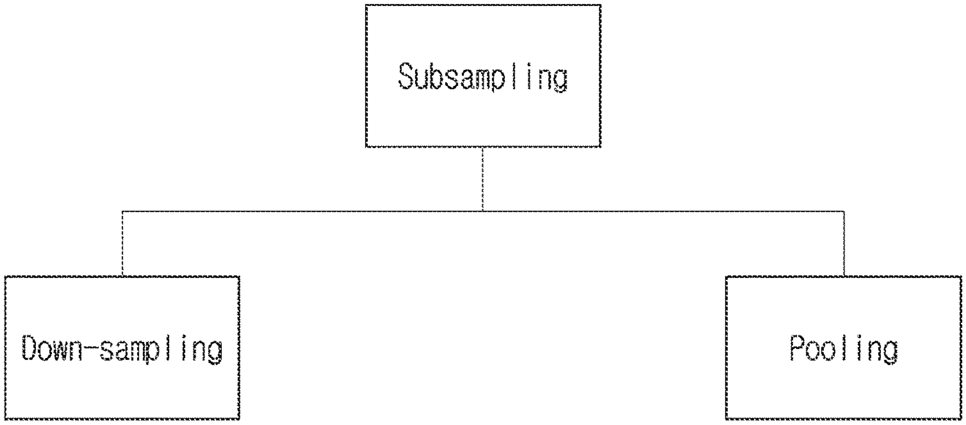
FIG. 20 is a diagram showing types of sub-sampling according to an embodiment of the present disclosure.

The sub-sampling method of feature data may include a down-sampling method and a pooling method as shown in FIG. 20.

The down-sampling method is a method that uses correlation between surrounding data, and can be more effective for a feature tensor extracted from a layer with low depth so that inter-channel correlation remains. In one embodiment, the down-sampling method is a method of performing interpolation on feature data.

Figure 21:
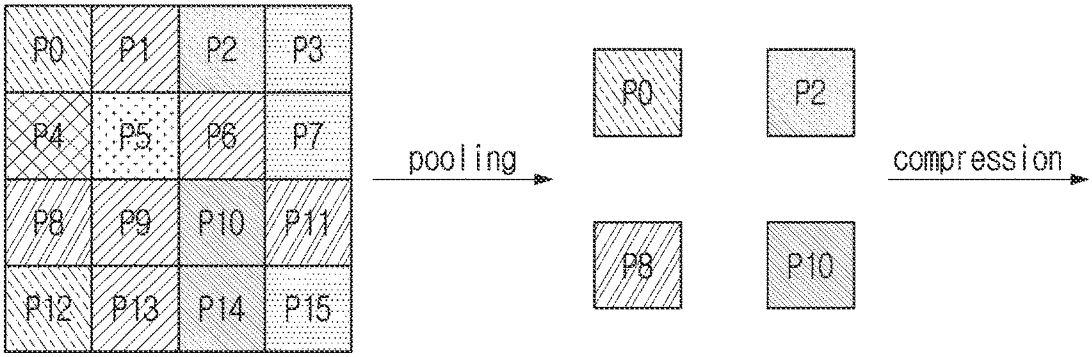
FIG. 21 is a diagram for explaining a down-sampling method.

An example of the down-sampling method is shown in FIG. 21. Referring to FIG. 21, the feature data P0, P1, P4, and P5 may be interpolated to calculate a median value Pi, thereby sub-sampling the feature data. Additionally, the feature data P2, P3, P6, and P7 may be interpolated to calculate a median value Pl, thereby sub-sampling the feature data. Additionally, the feature data P8, P9, P12, and P13 may be interpolated to calculate a median value Pk, thereby sub-sampling the feature data. Additionally, the feature data P10, P11, P14, and P15 may be interpolated to calculate a median value Pl, thereby sub-sampling the feature data.

The pooling method is a method that does not consider correlation between surrounding data, and can be more effective for a feature tensor extracted from a layer with high depth so that correlation between channels has been removed. In one embodiment, the pooling method is a method of extracting any data without considering correlation between surrounding data, and may be the same/similar to the pooling used in the layer of a neural network.

Figure 22:
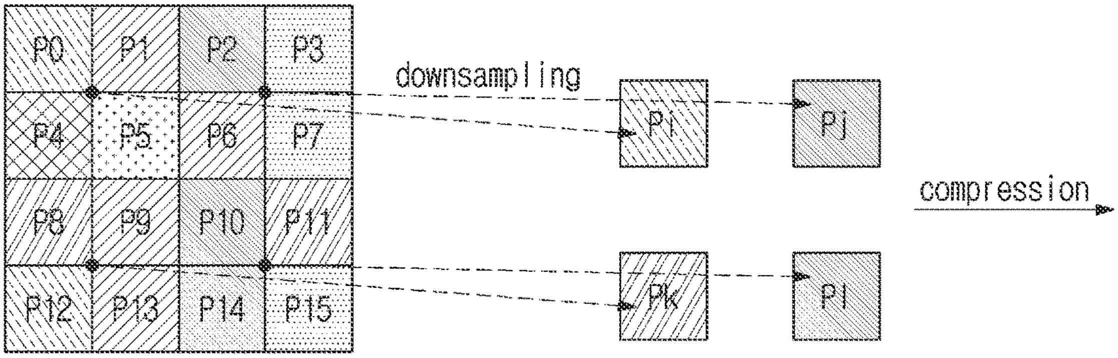
FIG. 22 is a diagram for explaining a pooling method.

An example of the pooling method is as shown in FIG. 22. Referring to FIG. 22, pooling is performed on feature data P0, P1, P4, and P5 to arbitrarily extract P0, thereby sub-sampling the feature data. Additionally, pooling is performed on feature data P2, P3, P6, and P7 to arbitrarily extract P2, thereby sub-sampling the feature data. Additionally, pooling is performed on feature data P8, P9, P12, and P13 to arbitrarily extract P8, thereby sub-sampling the feature data. Additionally, pooling is performed on feature data P10, P11, P14, and P15 to arbitrarily extract P10, thereby sub-sampling the feature data.

As described above, according to Embodiment 3 of the present disclosure, sub-sampling may be performed on feature data at the encoder stage, and feature encoding may be performed on the sub-sampled feature data. The sub-sampling may be performed before or after normalization and quantization of feature data based on task purpose, system requirements, etc. Additionally, the sub-sampling may be performed using either the down-sampling method or the pooling method based on inter-channel correlation. Such sub-sampling can dramatically reduce the amount of feature data, thereby improving coding efficiency.

Embodiment 4

Embodiment 4 of the present disclosure relates to an up-sampling method of feature data. The up-sampling may be performed considering dequantization/denormalization of feature data.

Figure 23:
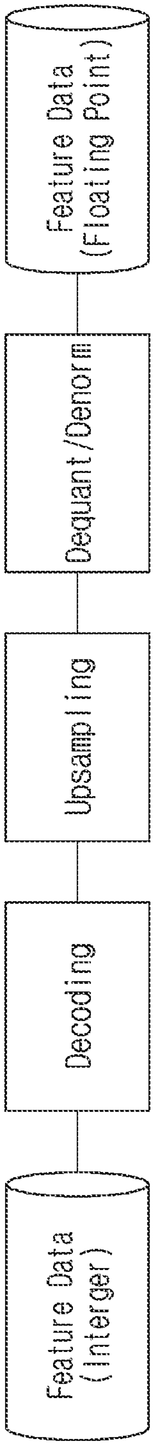
FIGS. 23 and 24 are diagrams for explaining an up-sampling method of feature data according to an embodiment of the present disclosure.
Figure 24:
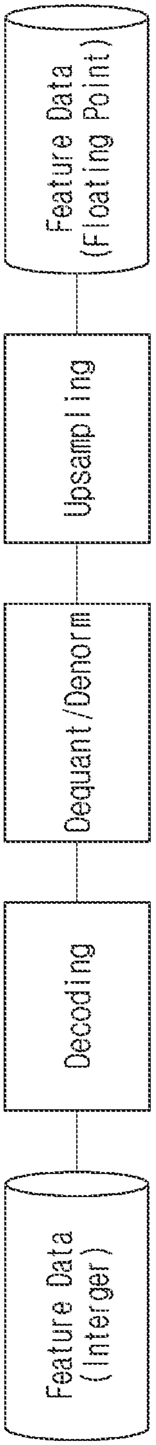

FIGS. 23 and 24 are diagrams for explaining an up-sampling method of feature data according to an embodiment of the present disclosure.

Referring first to FIG. 23, in one embodiment, up-sampling of feature data may be performed before dequantization and denormalization processes. When performing up-sampling on feature data that has not been dequantized or denormalized, minimum/maximum values considering the up-sampling may be set during the quantization and normalization process, and in the decoder stage, the inverse process may be performed based on this.

Next, referring to FIG. 24, in another embodiment, up-sampling of feature data may be performed after dequantization and denormalization processes. By performing up-sampling on the dequantized and denormalized feature data, it is possible to use feature data transformed into a floating point form, which can be advantageous in terms of precision compared to the case of FIG. 23.

Figure 25:
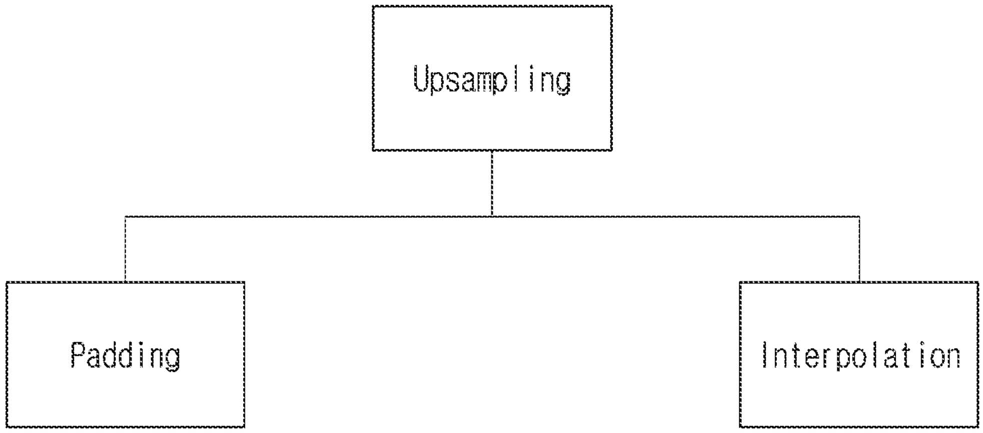
FIG. 25 is a diagram showing types of up-sampling according to an embodiment of the present disclosure.

The up-sampling method of feature data may include a padding method and an interpolation method as shown in FIG. 25.

The padding method is the inverse operation of pooling of a neural network and can be more effective when there is no correlation between surrounding data. In other words, if there is no correlation between surrounding data, using the interpolation method may result in lower accuracy than data generated using the padding method. However, in the case of data of an extraction point where correlation between surrounding data remains, the interpolation method may be more effective.

As described above, according to Embodiment 4 of the present disclosure, up-sampling may be performed on feature data at the decoder stage, and feature reconstruction may be performed on the up-sampled feature data. The sub-sampling may be performed before or after dequantization and denormalization of feature data based on task purpose, system requirements, etc. Additionally, the sub-sampling may be performed using either a padding method or an interpolation method based on inter-channel correlation. Through such up-sampling, feature data may be reconstructed to the same/similar amount of data as the original, thereby preventing task performance degradation.

Embodiment 5

Embodiment 5 of the present disclosure relates to a method of skipping the above-described up-sampling. Specifically, even when feature data is sub-sampled, the feature data does not necessarily have to be up-sampled depending on the task purpose, system requirements, etc. This is also true for images/videos, because, for example, even if 4K images are downsized to full-HD images and encoded/decoded, there is only resolution deterioration and there is no problem with the display (i.e., human vision). On the other hand, in the case of machine tasks, since the main purpose is object detection/tracking/segmentation, etc., the disadvantage due to resolution deterioration may be said to be smaller than in the case of images/videos. Accordingly, according to Embodiment 5 of the present disclosure, a method of storing the sub-sampled feature data in a buffer (encoder stage) or outputting it to a task network (decoder stage) without up-sampling is proposed.

Figure 26:
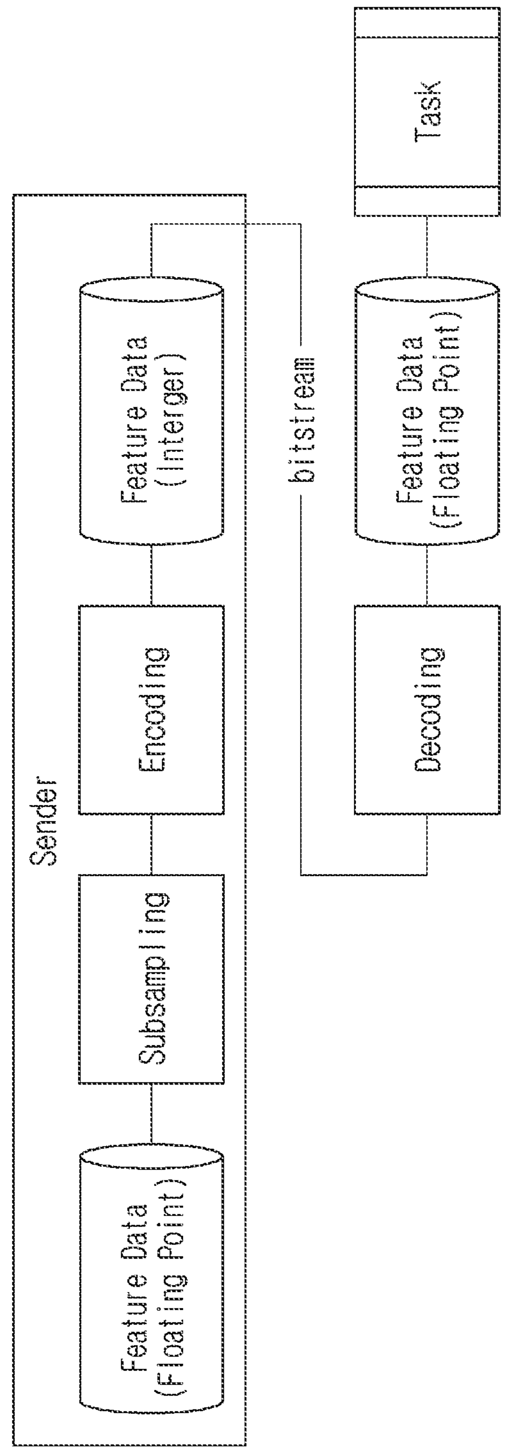
FIG. 26 is a diagram for explaining a method of skipping up-sampling of feature data according to an embodiment of the present disclosure.

FIG. 26 is a diagram for explaining a method of skipping up-sampling of feature data according to an embodiment of the present disclosure.

Referring to FIG. 26, at the transmission end (or encoder stage), sub-sampling may be performed on floating point type feature data and then feature encoding may be performed on the sub-sampled feature data. On the other hand, at the reception end (or decoder stage), up-sampling for the sub-sampled feature data may be skipped.

As described above, according to Embodiment 5 of the present disclosure, sub-sampling on feature data may be performed in the encoder stage, but up-sampling on the sub-sampled feature data may be skipped. Accordingly, an increase in complexity can be prevented and coding efficiency can be improved.

Embodiment 6

Embodiment 6 of the present disclosure relates to a method of processing the above-described sub-sampling and up-sampling processes of feature data in an in-loop form rather than in the pre-processing/post-processing form of Embodiments 3 to 5.

Figure 27:
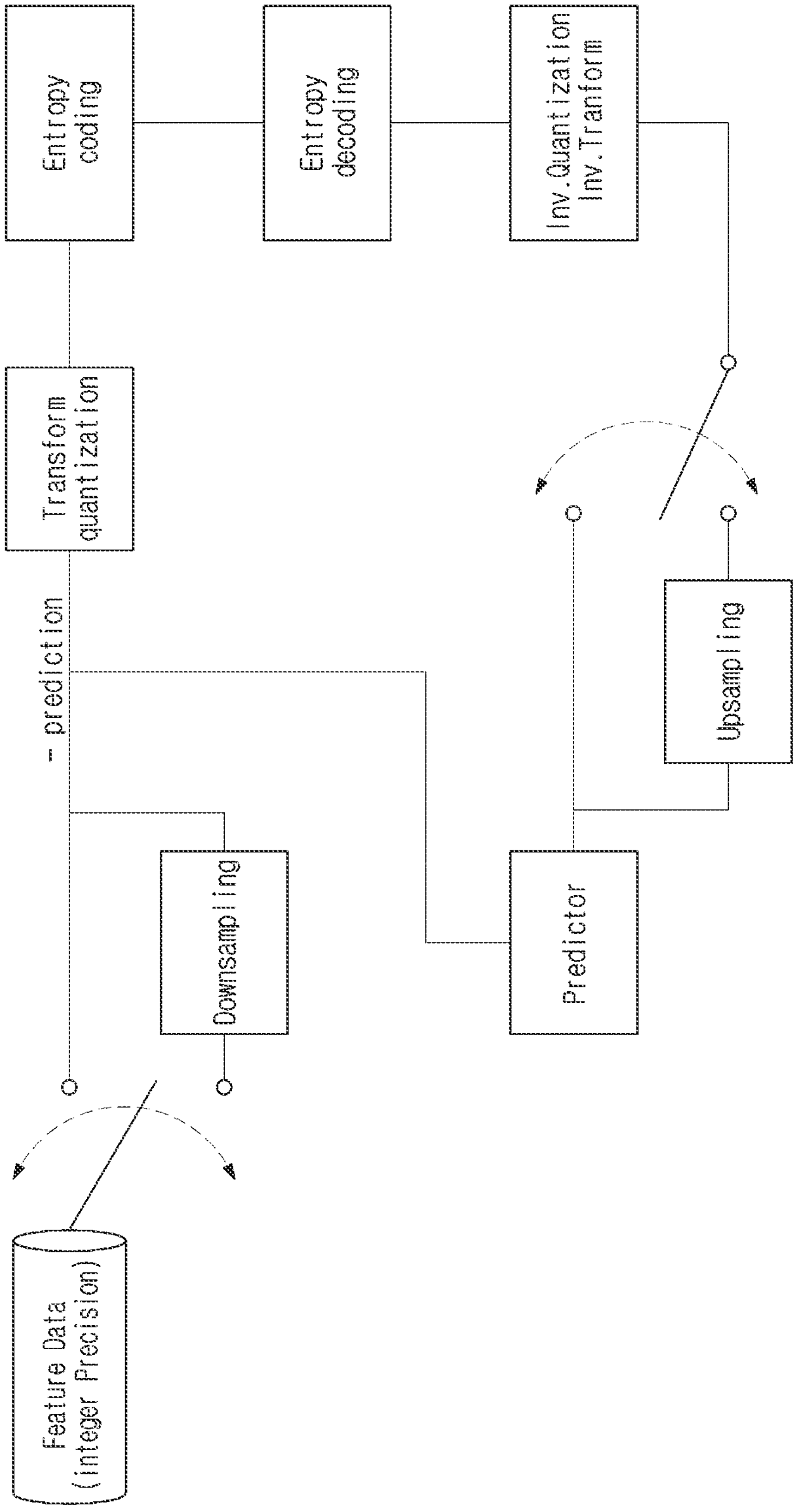
FIG. 27 is a diagram for explaining sub-sampling and up-sampling methods of feature data according to an embodiment of the present disclosure.

FIG. 27 is a diagram for explaining sub-sampling and up-sampling methods of feature data according to an embodiment of the present disclosure.

Referring to FIG. 27, sub-sampling on feature data may be selectively performed at the encoder stage. For example, the sub-sampling may not be performed if the feature data is integer data, and the sub-sampling may be performed only if the feature data is floating point data. Prediction, transform/quantization, and entropy coding may be performed on feature data at the encoder stage, and the encoded feature data may be reconstructed through entropy decoding and dequantization/inverse transform processes to be used as a reference for a next encoding process. During the reconstruction process, up-sampling of feature data may be selectively performed. For example, the up-sampling may be performed only when sub-sampling is performed on feature data.

Above, according to Embodiment 6 of the present disclosure, sub-sampling and up-sampling on feature data may be performed in an in-loop form rather than in a preprocessing/post-processing form. In this process, in the case of a certain machine task, such as object tracking, feature data located in the past time period based on the time axis may be used in the prediction process, and the adaptively decoded feature data may be selectively up-sampled, thereby improving prediction efficiency.

Embodiment 7

Embodiment 7 of the present disclosure proposes syntaxes to support up-sampling of feature data.

Figures 28, 29, 30:
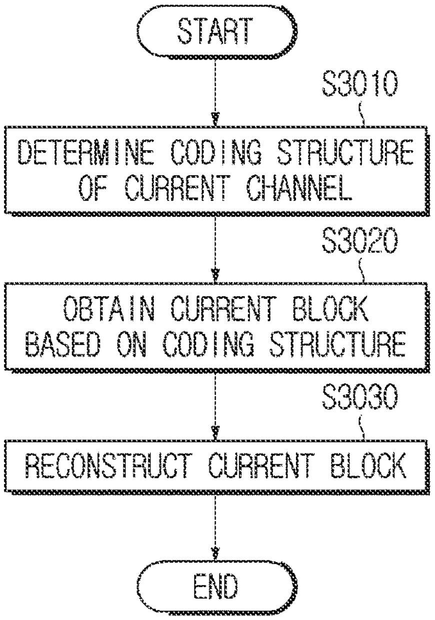
FIG. 28 is a diagram showing Feature_Data parameter_set syntax according to an embodiment of the present disclosure.
FIG. 29 is a diagram showing UpSampling parameter_set syntax according to an embodiment of the present disclosure.
FIG. 30 is a flowchart showing a feature decoding method according to an embodiment of the present disclosure.

FIG. 28 is a diagram showing Feature_Data_parameter_set syntax according to an embodiment of the present disclosure.

Referring to FIG. 28. Feature_Data_parameter_set syntax may include syntax elements Feature_data_width, Feature_data_height, Feature_data_ch, ut_feature_data_width, Out_feature_data_height, and Out_feature_data_ch.

The syntax elements Feature_data_width, Feature_data_height, and Feature_data_ch may specify the size of feature data signaled to the feature decoder. If feature data is sub-sampled at the encoder stage, the size of the feature data may specify the size of the sub-sampled feature data.

The syntax elements Out_feature_data_width, Out_feature_data height, and Out_feature_ch may specify the size of decoded feature data. For example, when feature data of 1920×1080×64 is sub-sampled into feature data of 416×240×32 at the encoder stage, and transformed into the original size at the decoder stage and up-sampled to 1920×1080×64, the syntax elements may be encoded in the bitstream as follows and signaled to the feature decoder.

Feature_data_width (416)
Feature_data_height (240)
Feature_data_ch (32)
Out_feature_data_width (1920)
Out feature data height (1080)
Out_feature_data_ch (64)

The feature decoder may derive a sampling rate based on the above information, and determine an up-sampling rate based on the derived sampling rate as follows.

HorizontalRatio=Out_feature_data_width/Feature_data_width
VerticalRatio=Out_feature_data_height/Feature_data_height
InterChRatio=Out_feature_data_ch/Feature_data_ch Meanwhile, filter information may be encoded/signaled to specify which sampling method to use at the decoder stage. An example of syntax including the filter information is shown in FIG. 29.

FIG. 29 is a diagram showing UpSampling parameter_set syntax according to an embodiment of the present disclosure.

Referring to FIG. 29, UpSampling parameter_set syntax may include syntax elements Num_Filter_Tap and FilterCoeff [i].

The syntax element Num_Filter Tap may specify the number of filter taps of the interpolation filter for up-sampling at the decoder stage. Additionally, the syntax element FilterCoeff [i] may specify the filter coefficient of the interpolation filter. For example, when a 6-tap interpolation filter is used for the up-sampling. Num_Filter_Tap may be encoded/signaled as 6, and six FilterCoeffs may be encoded/signaled. If a padding method is used for the up-sampling, the encoding/signaling of Num Filter Tap may be skipped or encoded/signaled as 0.

As described above, according to Embodiment 7 of the present disclosure, size information and interpolation filter information of feature data may be encoded/signaled for up-sampling of feature data.

Feature Decoding/Encoding Method

FIG. 30 is a flowchart showing a feature decoding method according to an embodiment of the present disclosure. The feature decoding method of FIG. 30 may be performed by the decoding apparatus of FIG. J.

Referring to FIG. 30, the decoding apparatus may determine a coding structure of a current channel in a feature map (S3010).

In one embodiment, the coding structure of the current channel may be determined based on whether an inter-channel reference referencing a coding structure of a previously reconstructed channel is applied to the current channel. For example, based on the inter-channel reference being applied, the coding structure of the current channel may be determined based on the coding structure of the previously reconstructed reference channel in the feature map. Alternatively, based on the inter-channel reference being not applied, the coding structure of the current channel may be determined based on the coding structure information of the current channel obtained from a bitstream.

In one embodiment, whether to apply the inter-channel reference may be determined based on inter-channel reference information obtained from the bitstream. The inter-channel reference information may include index information indicating a previously reconstructed reference channel in the feature map, first flag information indicating whether the overall coding structure of the current block is the same as the reference channel, and second flag information indicating whether a lower coding structure of the current block is the same as the reference channel.

The decoding apparatus may obtain a current block by splitting the current channel based on the coding structure (S3020). And, the decoding apparatus may reconstruct the obtained current block (S3030).

In one embodiment, reconstructing the current block may include up-sampling the obtained current block, and dequantizing and denormalizing the up-sampled current block.

In one embodiment, reconstructing the current block may include dequantizing and denormalizing the obtained current block, and up-sampling the dequantized and denormalized current block.

In one embodiment, up-sampling the reconstructed current block may be further included. At this time, the up-sampling may be referred to as in-loop up-sampling.

Figure 31:
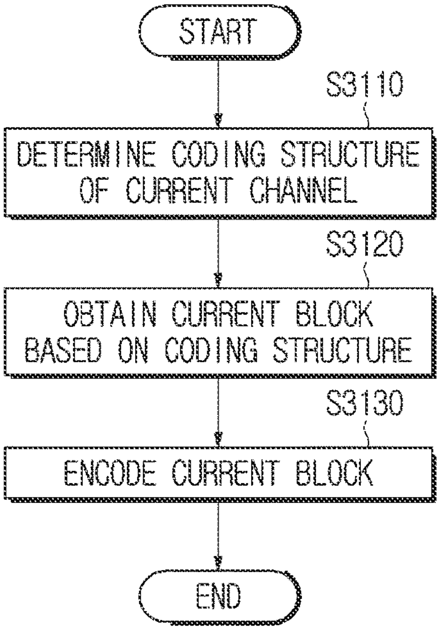
FIG. 31 is a flowchart illustrating a feature encoding method according to an embodiment of the present disclosure.

FIG. 31 is a flowchart illustrating a feature encoding method according to an embodiment of the present disclosure. The feature encoding method of FIG. 31 may be performed by the encoding apparatus of FIG. 2.

Referring to FIG. 31, the encoding apparatus may determine a coding structure of a current channel in a feature map (S3110).

In one embodiment, the coding structure of the current channel may be determined based on whether an inter-channel reference referencing a coding structure of a previously encoded channel is applied to the current channel. For example, based on the inter-channel reference being applied, the coding structure of the current channel may be determined based on the coding structure of the previously encoded reference channel in the feature map. Alternatively, based on the inter-channel reference being not applied, the coding structure of the current channel may be determined without referencing the coding structure of another channel. In this case, the coding structure information indicating the coding structure of the current channel may be encoded in a bitstream.

In one embodiment, whether or not the inter-channel reference is applied may be encoded in a bitstream as inter-channel reference information. The inter-channel reference information may include index information indicating a previously reconstructed reference channel in the feature map, first flag information indicating whether the overall coding structure of the current block is the same as the reference channel, and second flag information indicating whether a lower coding structure of the current block is the same as the reference channel.

The encoding apparatus may obtain a current block by splitting the current channel based on the coding structure (S3120). In addition, the encoding apparatus may encode the obtained current block (S3130).

In one embodiment, encoding the current block may include normalizing and quantizing the obtained current block, and sub-sampling the normalized and quantized current block.

In one embodiment, encoding the current block may include sub-sampling the obtained current block, and normalizing and quantizing the sub-sampled current block.

As described above, according to the feature decoding/decoding method according to an embodiment of the present disclosure, the coding structure of the current channel is determined with reference to the coding structure of the previous channel, so that there is no need to additionally encode/decode the coding structure information. Therefore, the number of bits can be reduced and coding efficiency can be further improved. Additionally, a plurality of hierarchically defined syntaxes may be provided to support inter-channel reference of the coding structure.

According to the feature decoding/coding method according to an embodiment of the present disclosure, the data amount of feature data can be dramatically reduced by sub-sampling, and thus coding efficiency can be further improved. Additionally, through up-sampling, feature data can be reconstructed to the same/similar amount of data as the original, thereby preventing task performance degradation. Additionally, by skipping up-sampling on sub-sampled feature data, an increase in complexity can be prevented and coding efficiency can be improved. Additionally, sub-sampling and up-sampling of feature data may be performed in a pre-processing/post-processing form or in an in-loop form. Additionally, size information and interpolation filter information of feature data may be encoded/signaled for up-sampling of feature data.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Embodiments described in the present disclosure may be implemented and performed on a processor, microprocessor, controller, or chip. For example, the functional units shown in each drawing may be implemented and performed on a computer, processor, microprocessor, controller, or chip. In this case, information for implementation (e.g., information on instructions) or algorithm may be stored in a digital storage medium.

In addition, the decoder (decoding apparatus) and the encoder (encoding apparatus), to which the embodiment(s) of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, an argument reality (AR) device, a video telephony video device, a transportation terminal (e.g., vehicle (including autonomous vehicle) terminal, robot terminal, airplane terminal, ship terminal, etc.) and a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Additionally, a processing method to which the embodiment(s) of the present disclosure is applied may be produced in the form of a program executed by a computer and stored in a computer-readable recording medium. Multimedia data having a data structure according to the embodiment(s) of this document may also be stored in a computer-readable recording medium. Computer-readable recording media include all types of storage devices and distributed storage devices that store computer-readable data. Computer-readable recording media include, for example. Blu-ray Disc (BD), Universal Serial Bus (USB). ROM, PROM, EPROM. EEPROM, RAM, CD-ROM, magnetic tape, floppy disk, and optical data storage device. Additionally, computer-readable recording media include media implemented in the form of carrier waves (e.g., transmission via the Internet). Additionally, the bitstream generated by the encoding method may be stored in a computer-readable recording medium or transmitted through a wired or wireless communication network.

Additionally, the embodiment(s) of the present disclosure may be implemented as a computer program product by program code, and the program code may be executed on a computer by the embodiment(s) of the present disclosure. The program code may be stored on a carrier readable by a computer.

Figure 32:
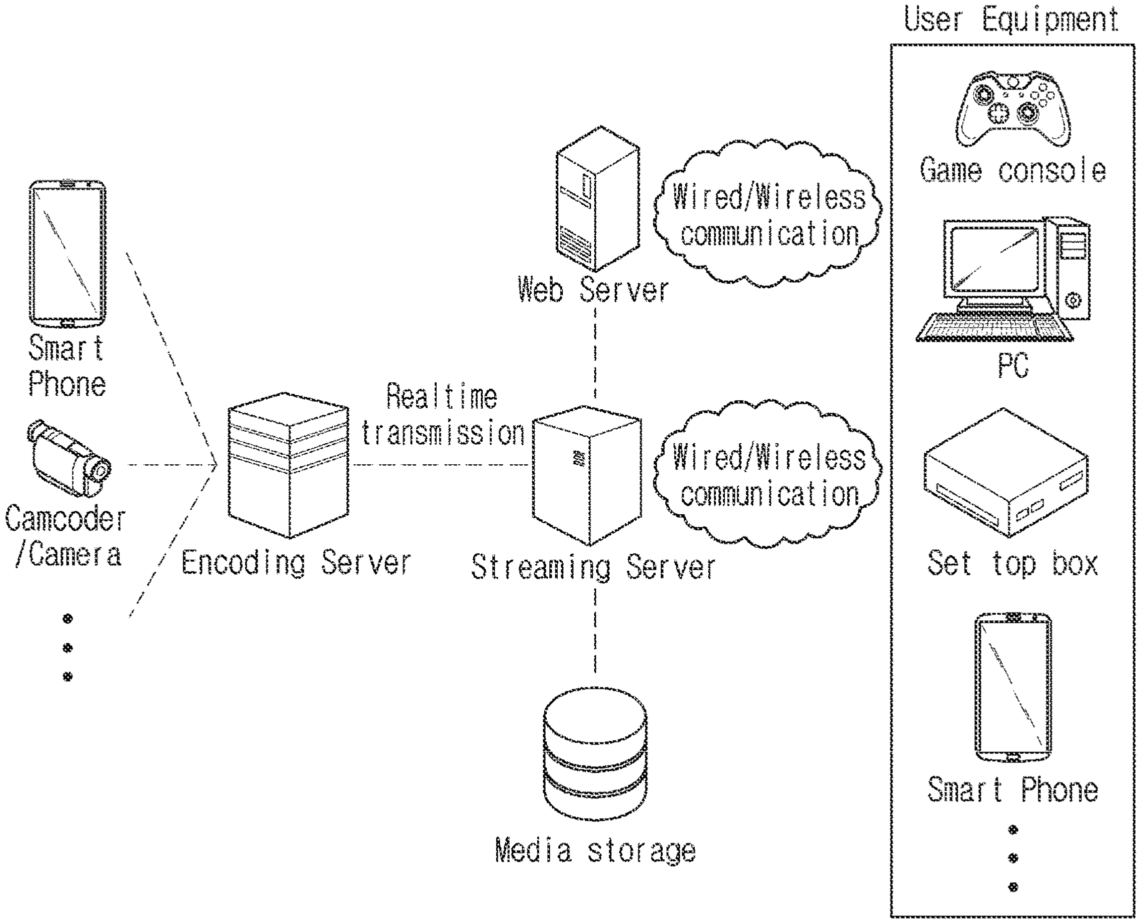
FIG. 32 is a view illustrating an example of a content streaming system to which embodiments of the present disclosure are applicable.

FIG. 32 is a view illustrating an example of a content streaming system to which embodiments of the present disclosure are applicable.

Referring to FIG. 32, the content streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

Figure 33:
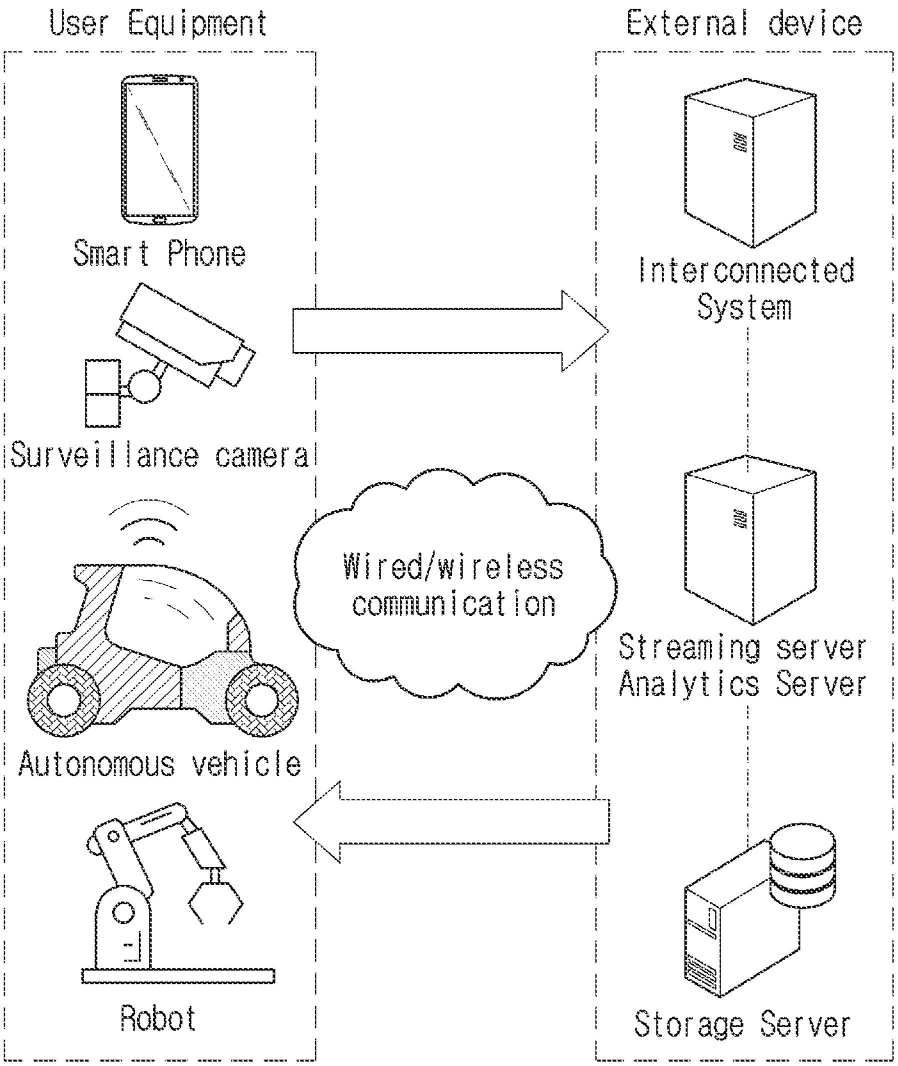
FIG. 33 is a view showing another example of a content streaming system to which embodiments of the present disclosure are applicable.

FIG. 33 is a diagram illustrating another example of a content streaming system to which embodiments of the present disclosure are applicable.

Referring to FIG. 33, in an embodiment such as VCM, a task may be performed in a user terminal or a task may be performed in an external device (e.g., streaming server, analysis server, etc.) according to the performance of the device, the user's request, the characteristics of the task to be performed, etc. In this way, in order to transmit information necessary to perform a task to an external device, the user terminal may generate a bitstream including information necessary to perform the task (e.g., information such as task, neural network and/or usage) directly or through an encoding server.

In an embodiment, the analysis server may perform a task requested by the user terminal after decoding the encoded information received from the user terminal (or from the encoding server). At this time, the analysis server may transmit the result obtained through the task performance back to the user terminal or may transmit it to another linked service server (e.g., web server). For example, the analysis server may transmit a result obtained by performing a task of determining a fire to a fire-related server. In this case, the analysis server may include a separate control server. In this case, the control server may serve to control a command/response between each device associated with the analysis server and the server. In addition, the analysis server may request desired information from a web server based on a task to be performed by the user device and the task information that may be performed. When the analysis server requests a desired service from the web server, the web server transmits it to the analysis server, and the analysis server may transmit data to the user terminal. In this case, the control server of the content streaming system may serve to control a command/response between devices in the streaming system.

The embodiments of the present disclosure may be used to encode or decode a feature/feature map.

What is claimed is:

1. A feature decoding method performed by a feature decoding apparatus, the feature decoding method comprising:
- determining a coding structure of a current channel in a feature map;
- obtaining a current block by splitting the current channel based on the coding structure; and
- reconstructing the current block,
- wherein the coding structure of the current channel is determined based on whether inter-channel reference referencing a coding structure of a previously reconstructed channel is applied to the current channel.

2. The feature decoding method of claim 1, wherein whether the inter-channel reference is applied is determined based on inter-channel reference information obtained from a bitstream.

3. The feature decoding method of claim 2, wherein the inter-channel reference information comprises index information specifying a previously reconstructed reference channel in the feature map, first flag information specifying whether the overall coding structure of the current block is the same as the reference channel, and second flag information specifying whether a lower coding structure of the current block is the same as the reference channel.

4. The feature decoding method of claim 1, wherein based on the inter-channel reference being applied, the coding structure of the current channel is determined based on a coding structure of a previously reconstructed reference channel in the feature map.

5. The feature decoding method of claim 1, wherein based on the inter-channel reference being not applied, the coding structure of the current channel is determined based on coding structure information of the current channel obtained from a bitstream.

6. The feature decoding method of claim 1, wherein the reconstructing the current block comprises:
- up-sampling the obtained current block; and
- dequantizing and denormalizing the up-sampled current block.

7. The feature decoding method of claim 1, wherein the reconstructing the current block comprises:

dequantizing and denormalizing the obtained current block; and up-sampling the dequantized and denormalized current block.

8. The feature decoding method of claim 1, further comprising up-sampling the reconstructed current block.

9. A feature encoding method performed by a feature encoding apparatus, the feature encoding method comprising:

determining a coding structure of a current channel in a feature map;

obtaining a current block by splitting the current channel based on the coding structure; and encoding the current block, wherein the coding structure of the current channel is determined based on whether inter-channel reference referencing a coding structure of a previously encoded channel is applied to the current channel.

10. The feature encoding method of claim 9, wherein based on the inter-channel reference being applied, the coding structure of the current channel is determined based on a coding structure of a previously encoded reference channel in the feature map.

11. The feature encoding method of claim 9, wherein based on the inter-channel reference being not applied, the coding structure of the current channel is determined based on coding structure information of the current channel obtained from a bitstream.

12. The feature encoding method of claim 9, wherein the encoding the current block comprises:

normalizing and quantizing the obtained current block; and sub-sampling the normalized and quantized current block.

13. The feature encoding method of claim 9, wherein the encoding the current block comprises:

sub-sampling the obtained current block; and normalizing and quantizing the sub-sampled current block.

14. A method of transmitting a bitstream generated by a feature encoding method, the feature encoding method comprising:

determining a coding structure of a current channel in a feature map;

obtaining a current block by splitting the current channel based on the coding structure; and encoding the current block, wherein the coding structure of the current channel is determined based on whether inter-channel reference referencing a coding structure of a previously encoded channel is applied to the current channel.

* * * * *